(12) United States Patent
Matsumura et al.

(10) Patent No.: US 10,827,478 B2
(45) Date of Patent: Nov. 3, 2020

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/324,244

(22) PCT Filed: Aug. 8, 2017

(86) PCT No.: PCT/JP2017/028802
§ 371 (c)(1),
(2) Date: Feb. 8, 2019

(87) PCT Pub. No.: WO2018/030418
PCT Pub. Date: Feb. 15, 2018

(65) Prior Publication Data
US 2019/0174473 A1 Jun. 6, 2019

(30) Foreign Application Priority Data
Aug. 10, 2016 (JP) .................................. 2016-157996

(51) Int. Cl.
*H04W 72/04* (2009.01)
*H04L 5/00* (2006.01)
(Continued)

(52) U.S. Cl.
CPC ......... *H04W 72/042* (2013.01); *H04L 5/0048* (2013.01); *H04L 5/0091* (2013.01); *H04L 5/14* (2013.01); *H04W 88/02* (2013.01)

(58) Field of Classification Search
None
See application file for complete search history.

(56) References Cited

U.S. PATENT DOCUMENTS

2009/0092138 A1 4/2009 Joo et al.
2010/0113046 A1 5/2010 Imamura et al.
(Continued)

FOREIGN PATENT DOCUMENTS

EP 2 731 395 A1 5/2014
JP 2010541370 A 12/2010
(Continued)

OTHER PUBLICATIONS

International Search Report issued for PCT/JP2017/028802, dated Oct. 3, 2017 (5 pages).
(Continued)

*Primary Examiner* — Brian S Roberts
(74) *Attorney, Agent, or Firm* — Osha Liang LLP

(57) ABSTRACT

The present invention is designed so that that resources are allocated adequately even in broadband communication. A user terminal, according to one aspect of the present invention, has a receiving section that receives specifying information for specifying a frequency offset of a radio resource relative to a reference resource and/or an allocation resource amount of the radio resource, and a control section that determines allocation of the radio resource based on the specifying information.

2 Claims, 33 Drawing Sheets

REFERENCE RESOURCE

(51) Int. Cl.
    *H04L 5/14* (2006.01)
    *H04W 88/02* (2009.01)

(56) References Cited

U.S. PATENT DOCUMENTS

| | | |
|---|---|---|
| 2011/0299496 A1 | 12/2011 | Iwai et al. |
| 2012/0063469 A1 | 3/2012 | Iwai et al. |
| 2012/0281654 A1 | 11/2012 | Aiba et al. |
| 2013/0039202 A1 | 2/2013 | Feuersanger et al. |
| 2013/0072242 A1 | 3/2013 | Iwai et al. |
| 2013/0329686 A1* | 12/2013 | Kim .................. H04L 5/001 370/329 |
| 2015/0215906 A1* | 7/2015 | Park .................. H04W 76/10 370/312 |
| 2018/0019855 A1 | 1/2018 | Zhang et al. |
| 2018/0183556 A1* | 6/2018 | Shin .................. H04L 5/0051 |
| 2019/0081765 A1* | 3/2019 | Si .................. H04W 72/04 |

FOREIGN PATENT DOCUMENTS

| | | |
|---|---|---|
| JP | 2013520053 A | 5/2013 |
| WO | 2008129797 A1 | 10/2008 |
| WO | 2010095430 A1 | 8/2010 |
| WO | 2010106784 A1 | 9/2010 |
| WO | 2011083769 A1 | 7/2011 |
| WO | 2016/119652 A1 | 8/2016 |

OTHER PUBLICATIONS

Written Opinion issued for PCT/JP2017/028802, dated Oct. 3, 2017 (5 pages).
3GPP TS 36.300 V8.12.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8); Mar. 2010 (149 pages).
Extended European Search Report in counterpart European Application No. 17839488.8 dated Jul. 15, 2019 (7 pages).

* cited by examiner

| Tier | ALLOCATION NUMBER | | NUMBER OF ALLOCATION NUMBERS |
|---|---|---|---|
| | START | END | |
| 0 | 0 | 0 | 1 |
| 1 | 1 | 5 | 5 |
| 2 | 6 | 14 | 9 |
| 3 | 15 | 27 | 13 |
| 4 | 28 | 44 | 17 |
| 5 | 45 | 65 | 21 |
| ... | ... | ... | ... |
| k | k(2k-1) | k(2k+3) | 4k+1 |

FIG. 8

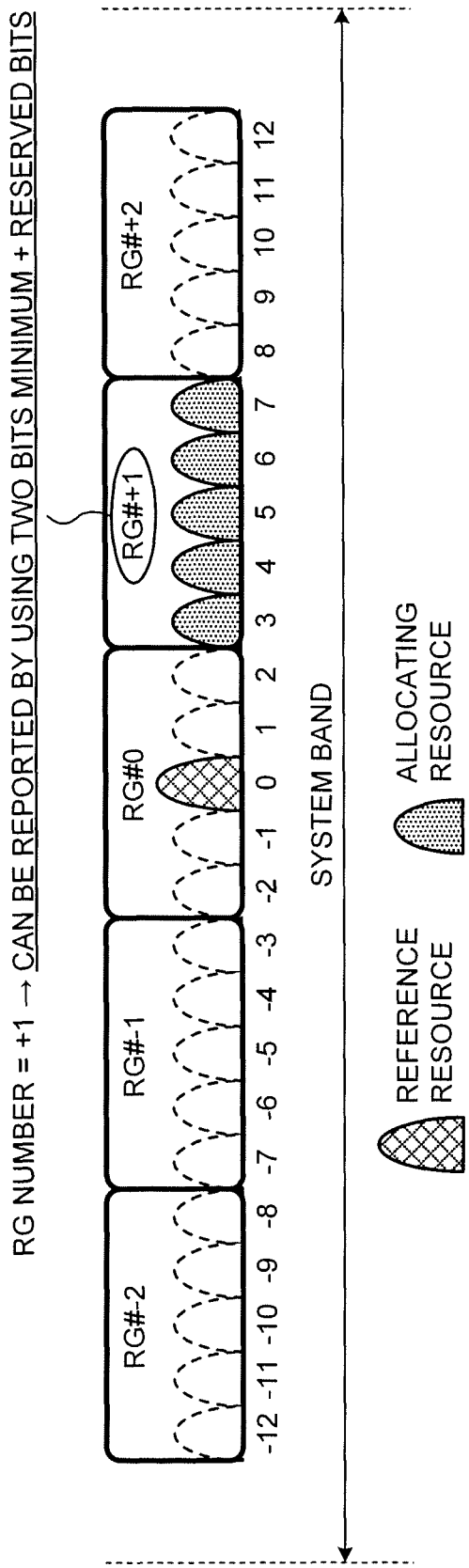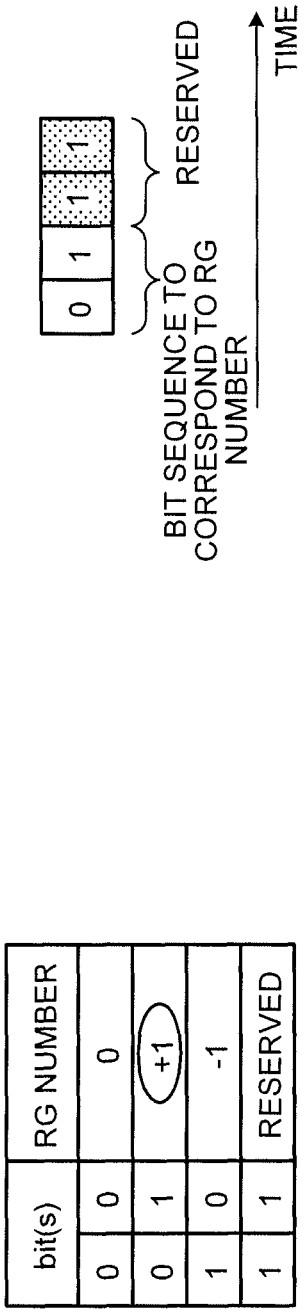
FIG. 12A
FIG. 12B
FIG. 12C

| bit(s) | | RELATIVE COORDINATE |
|---|---|---|
| 0 | 0 | 0 |
| 0 | 1 | +1 |
| 1 | 0 | -1 |
| 1 | 1 | +2 |

FIG. 16A

| bit(s) | | AMOUNT OF ALLOCATING RESOURCES |
|---|---|---|
| 0 | 0 | 1 |
| 0 | 1 | 2 |
| 1 | 0 | 3 |
| 1 | 1 | 4 |

FIG. 16B

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11," or "LTE Rel. 12") have been drafted for the purpose of achieving further broadbandization and increased speed beyond LTE (also referred to as "LTE Rel. 8" or "LTE Rel. 9"), and successor systems of LTE (also referred to as, for example, "FRA (Future Radio Access)," "5G (5th Generation mobile communication system)," "NR (New Radio)," "NX (New radio access)," "FX (Future generation radio access)," "LTE Rel. 13," "LTE Rel. 14," "LTE Rel. 15" or later versions) are under study.

In LTE Rel. 10/11, carrier aggregation (CA) to integrate multiple component carriers (CCs) is introduced in order to achieve broadbandization. Each CC is configured with the system bandwidth of LTE Rel. 8 as one unit. In addition, in CA, multiple CCs under the same radio base station (eNB (eNodeB)) are configured in a user terminal (UE (User Equipment)).

Meanwhile, in LTE Rel. 12, dual connectivity (DC), in which multiple cell groups (CGs) formed by different radio base stations are configured in UE, is also introduced. Each cell group is comprised of at least one cell (CC). Since multiple CCs of different radio base stations are integrated in DC, DC is also referred to as "inter-eNB CA."

Also, in LTE Rel. 8 to 12, frequency division duplex (FDD), in which downlink (DL) transmission and uplink (UL) transmission are made in different frequency bands, and time division duplex (TDD), in which downlink transmission and uplink transmission are switched over time and take place in the same frequency band, are introduced.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall description; Stage 2"

SUMMARY OF INVENTION

Technical Problem

Future radio communication systems (for example, 5G, NR, etc.) are expected to realize various radio communication services by fulfilling varying requirements (for example, ultra-high speed, large capacity, ultra-low latency, etc.).

For example, 5G is under research to provide various radio communication services, referred to as, for example, "eMBB (enhanced Mobile Broad Band)," "IoT (Internet of Things)," "MTC (Machine-Type Communication)," "M2M (Machine-To-Machine)," "URLLC (Ultra Reliable and Low Latency Communications)," and so on. Note that M2M may be referred to as "D2D (Device-To-Device)," "V2V (Vehicle-To-Vehicle)" and so on, depending on what communication device is used.

To fulfill the requirements for various types of communication such as listed above, studies are underway to develop new communication access schemes (new RATs (Radio Access Technologies)). For example, 5G is under research to provide services through ultra-wideband communications (for example, 1 GHz) by using very high carrier frequencies (for example, 100 GHz).

However, when trying to apply resource allocation methods for existing LTE systems to such ultra-wideband communications, an increased amount of information will be required in resource allocation, and a drop in throughput might be posed as a problem.

The present invention has been made in view of the above, and it is therefore an object of the present invention to provide a user terminal and a radio communication method, whereby resources can be allocated adequately even in wideband communications.

Solution to Problem

A user terminal, according to one aspect of the present invention, has a receiving section that receives specifying information for specifying a frequency offset of a radio resource relative to a reference resource and/or an allocation resource amount of the radio resource, and a control section that determines allocation of the radio resource based on the specifying information.

Advantageous Effects of Invention

According to the present invention, resources can be allocated adequately even in wideband communications.

BRIEF DESCRIPTION OF DRAWINGS

FIG. 8 shows an example of a table, in which allocation numbers are provided per tier;

FIG. 12A is a diagram to show an example where the resource allocation method illustrated in FIG. 10 is applied to resource groups (RGs), which are formed by bundling a number of resources, FIG. 12B is a table to show examples of associations between RG numbers and bit sequences, and FIG. 12C is a diagram to show an example of an RG number that is reported from a radio base station;

FIG. 16A is a table to show examples of associations between the relative coordinates and bit sequences shown in FIG. 15, and FIG. 16B is a table to show examples of associations between the amounts of allocating resources and bit sequences shown in the FIG. 15;

DESCRIPTION OF EMBODIMENTS

In existing LTE, the number of bits to constitute an allocation field, which is included in downlink control information (DCI (Downlink Control Information)), and which is where radio resources that are used to transmit/receive signals are allocated, is expressed as a function of system bandwidth. For example, in type 0/1 resource allocation, the number of bits to constitute the allocation field is expressed by following equation 1:

$$\left\lceil \frac{N_{RB}}{P} \right\rceil \quad \text{(Equation 1)}$$

Here, P is the size of resource block groups, and $N_{RB}$ is the system bandwidth.

Also, in type 2 resource allocation, the number of bits to constitute the allocation field is expressed by following equation 2:

$$\left\lceil \log_2 \frac{N_{RB}(N_{RB}+1)}{2} \right\rceil \quad \text{(Equation 2)}$$

Therefore, for example, if the resource allocation method for existing LTE is applied, on an as-is basis, to 5G where the system band is anticipated to span 1 GHz, the number of control information bits will increase to keep up with the system bandwidth, and, consequently, a drop in throughput might be posed as a problem.

Therefore, the present inventors have come up with the idea of reporting resource allocation with a small amount of information compared to existing reporting methods, which depend upon system bandwidth.

Figure 1:
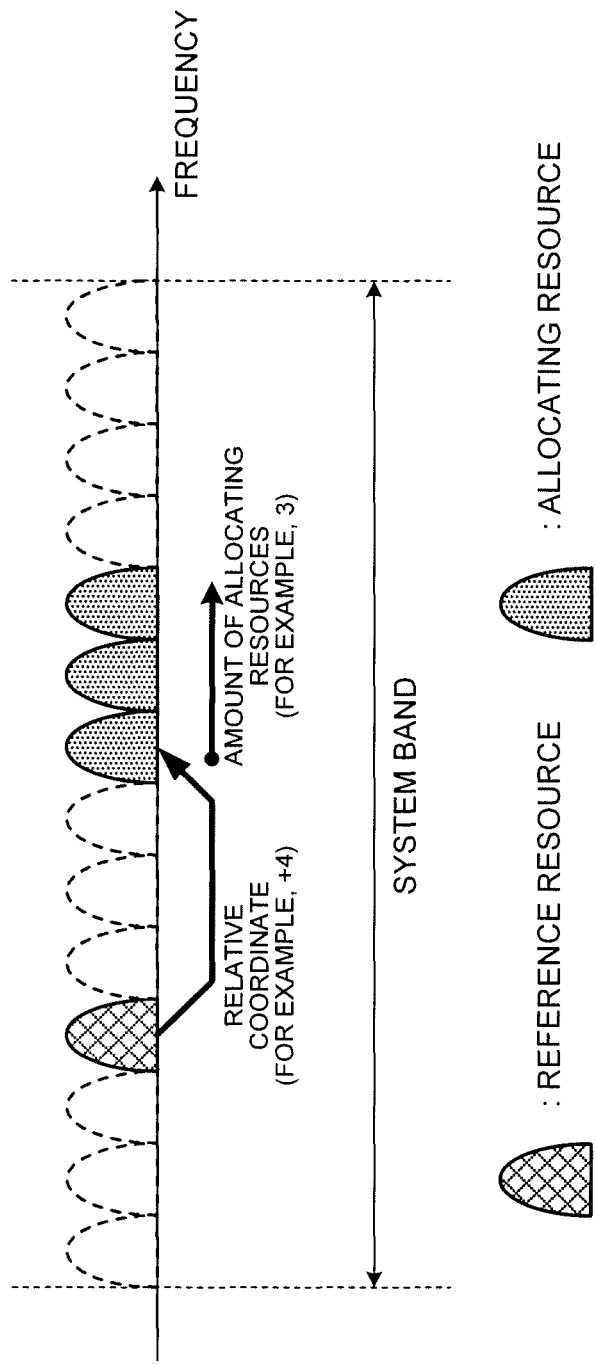
FIG. 1 is a diagram to show an overview of a resource allocation method according to one aspect of the present invention.

FIG. 1 is a diagram to show an overview of a resource allocation method according to one aspect of the present invention. In FIG. 1, a radio base station selects a predetermined reference resource within a system band. In addition, the radio base station reports the relative coordinate of radio resources that are allocated (+4 in FIG. 1), which is determined with respect to a reference resource, in the frequency direction, and the amount of radio resources that are allocated (3 in FIG. 1), to a user terminal, as specifying information that specifies the radio resources to allocate. Note that, the relative coordinate of radio resources in the frequency direction with respect to a reference resource may be referred to as the "starting location of allocating resources," "frequency offset," and so on.

According to one embodiment of the present invention, a user terminal determines the allocation of radio resources based on specifying information, which specifies the relative coordinates of radio resources in the frequency direction with respect to a reference resource, and/or the amount of radio resources that are allocated. By this means, the number of control information bits for use in resource allocation can be determined regardless of the system bandwidth. Therefore, even in wideband communications such as 5G, it is possible to prevent the number of control information bits from increasing, so that resources can be allocated adequately without causing a drop in throughput.

Now, embodiments of the present invention will be described in detail below with reference to the accompanying drawings. The radio communication methods according to individual embodiments may be applied alone or may be applied in combination. Also, in each embodiment, the specifying information may be included in downlink control information (DCI), or included in other information that is reported on a dynamic basis.

Radio Communication Method

First Embodiment

Figure 2:
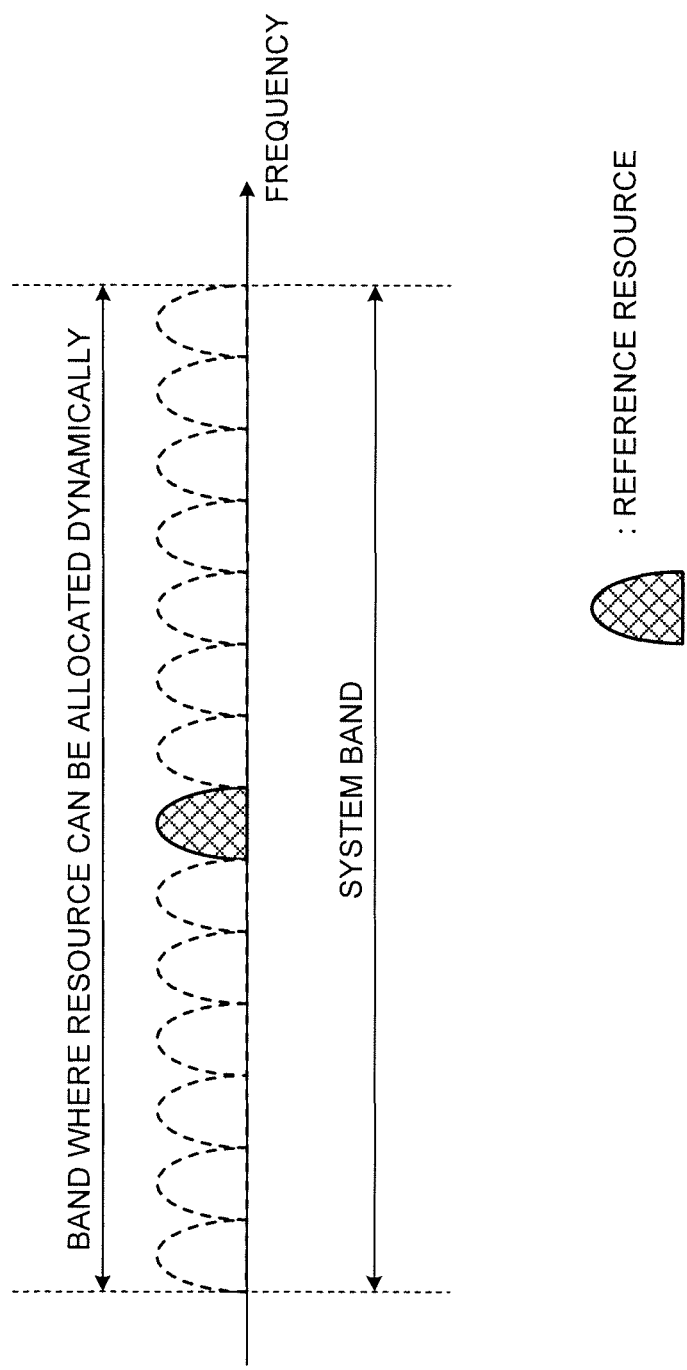
FIG. 2 is a diagram to show an example of the method of allocating resources according to a first embodiment of the present invention.

FIG. 2 is a diagram to show an example of the method of allocating resources according to the first embodiment of the present invention. According to the first embodiment, as shown in FIG. 2, no limit is set on resource allocation, and, where a system band is provided, resources can be allocated dynamically in the whole band. The first embodiment can be divided further based on the contents of the above-mentioned specifying information, its reporting method and so on (embodiments 1.1 to 1.2).

Embodiment 1.1

Figure 3:
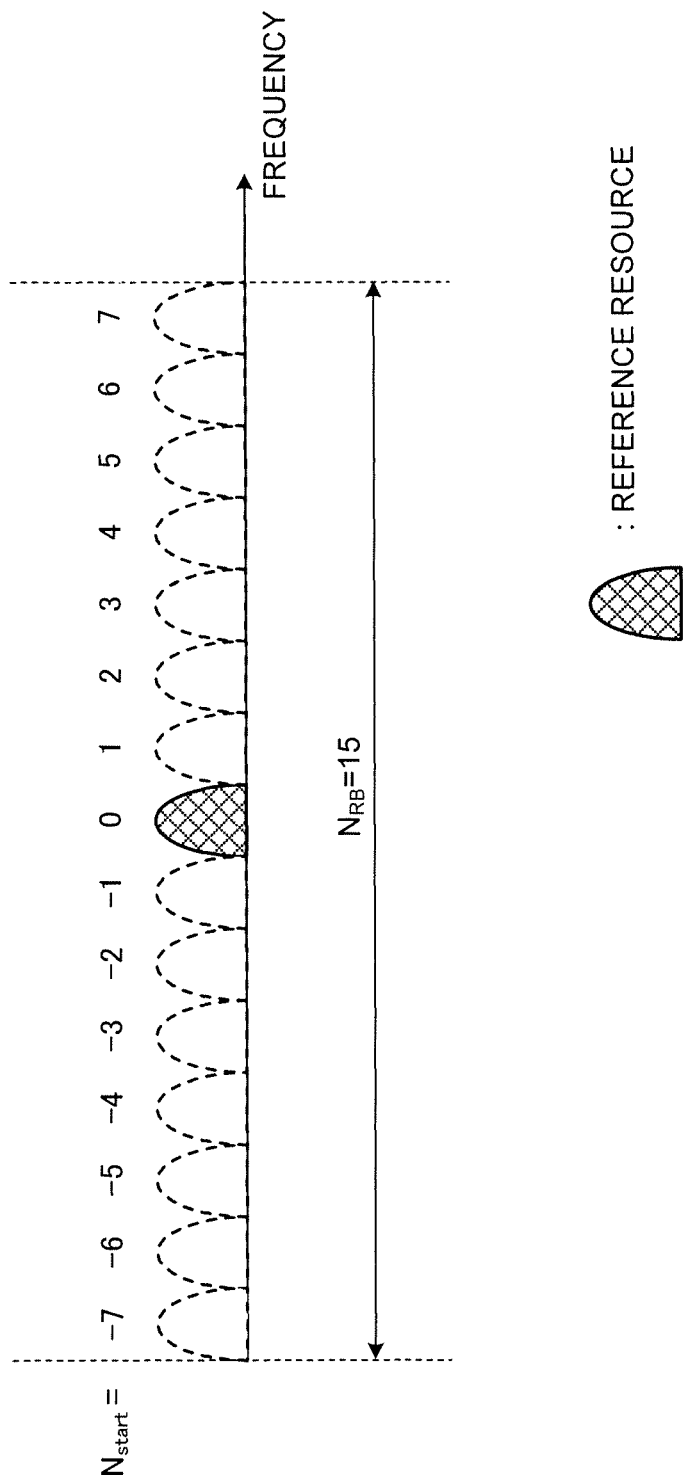
FIG. 3 is a diagram to show relative coordinates with respect to a reference resource.

Now, with reference to FIG. 2 and FIG. 3, embodiment 1.1 will be described below. FIG. 3 is a diagram to show relative coordinates with respect to a reference resource.

According to embodiment 1.1, the relative coordinates of radio resources in the frequency direction with respect to a reference resource (hereinafter simply referred to as "relative coordinates") and the amount of resources to be allocated are both reported to a user terminal. That is, according to embodiment 1.1, information of relative coordinates and information of the amount of allocating resources serve as specifying information.

First, relative coordinates will be described below. Consider the case where, for example, as shown in FIG. 3, the total number of resource blocks in the system band, $N_{RB}$, is 15, and the radio resource in the center of the system band is selected as the reference resource. In this case, the location (coordinate) of the reference resource is 0 ($N_{start}=0$). Here, the relative coordinates of radio resources with respect to the reference resource that grow larger in the frequency direction are expressed as 1 to 7 ($N_{start}=1$ to 7), and the relative coordinates of radio resources with respect to the reference resource that grow smaller in the frequency direction are expressed as −7 to −1 ($N_{start}=7$ to −1). Hereinafter, relative coordinates and the amount of allocating resources will be expressed in units of resource blocks (RBs), but this is by no means limiting. Note that the above-noted definition of relative coordinates will hold throughout the following embodiments.

In the example shown in FIG. 2, a user terminal can specify all the radio resources in the system band by using relative coordinates and the amount of allocating resources, so that the radio base station can allocate all the radio resources in the system band to the user terminal on a dynamic basis.

According to embodiment 1.1, resources are allocated based on the above-mentioned specifying information, so that it is possible allocate resources using less information than in existing reporting methods that depend upon system bandwidth.

Note that it is not necessary to report both relative coordinates and the amount of allocating resources to the user terminal as specifying information. For example, only information about relative coordinates may be reported to the user terminal as specifying information. In this case, the amount of allocating resources may be configured through higher layer signaling (for example, RRC (Radio Resource Control) signaling, broadcast information (MIB (Master Information Block), SIBs (System Information Blocks) and so on), MAC (Medium Access Control) signaling, and so forth), or may be provided in the specification in advance.

Embodiment 1.2

Figure 4:
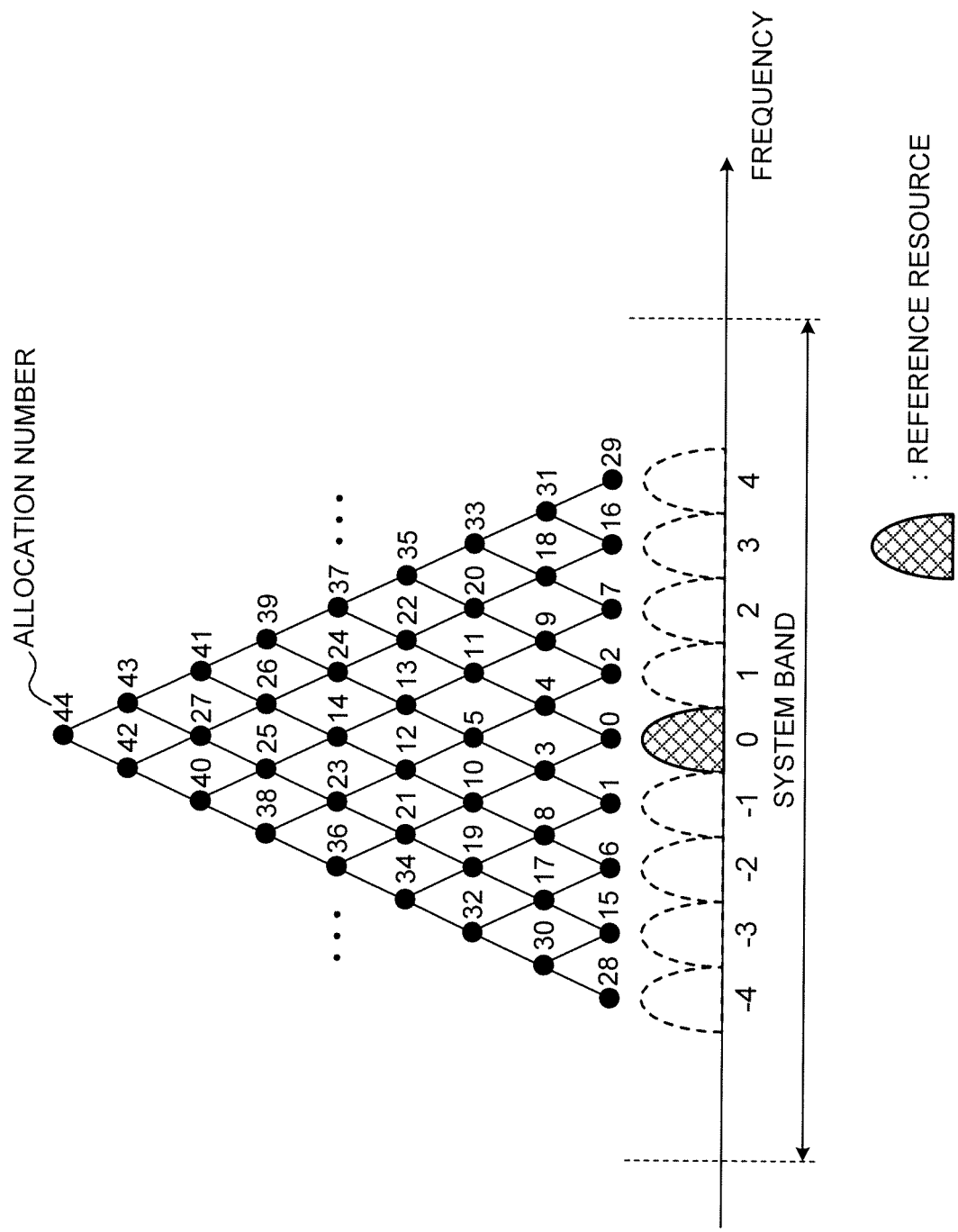
FIG. 4 is a diagram to show examples of allocation numbers, which specify relative coordinates with respect to a reference resource and the amount of allocating resources.

Next, embodiment 1.2 will be described below. According to embodiment 1.2, allocation numbers are selected (numbered or assigned) based on predetermined rules and reported to user terminals, as specifying information that specifies relative coordinates with respect to a reference resource, and the amount of resources that are allocated. FIG. 4 is a diagram to show examples of allocation numbers, which specify relative coordinates with respect to a reference resource and the amount of resources to be allocated.

As shown in FIG. 4, allocation numbers can be selected by using the location of the reference resource as the starting point. In FIG. 4, the location of the reference resource is used as the starting point (=0), and a plurality of allocation numbers (0 to 44), centering around this starting point, are selected. To be more specific, allocation numbers 0 to 44 are selected in association with the grid points of a triangular grid, where each side is the number of predetermined radio resources aligned in the frequency direction (grid interval=1) Note that the rules for selecting allocation numbers will be described later.

Figure 5A:
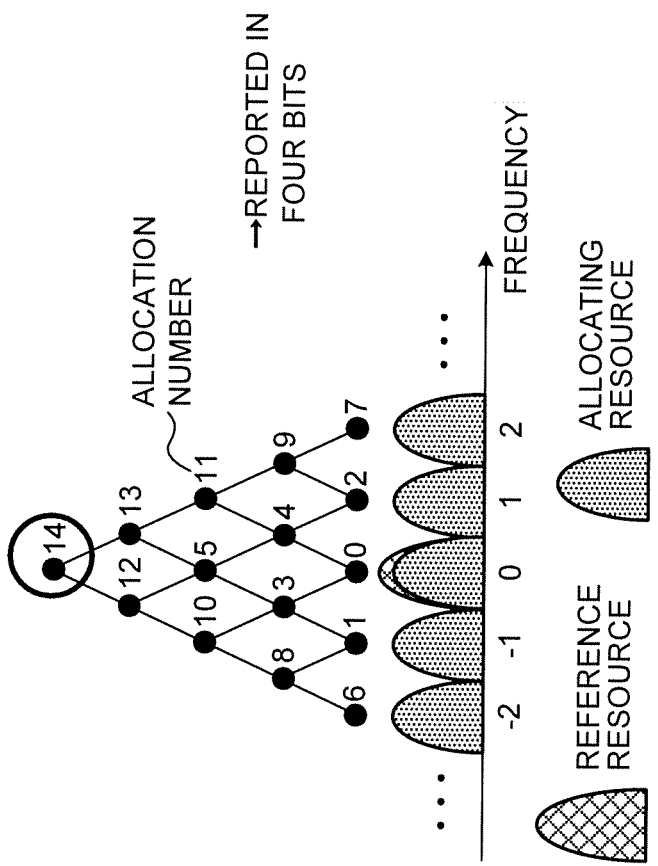
FIGS. 5A and 5B are diagrams, each showing a specific example of an allocation number that specifies the frequency offset with respect to a reference resource, and the amount of allocating resources.
Figure 5B:
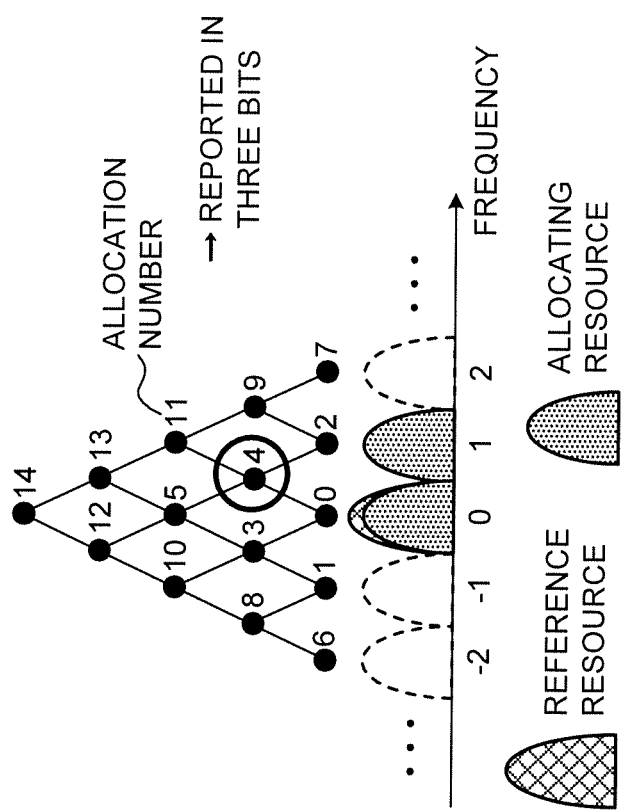

Now, with reference to FIG. 5, examples of specifying relative coordinates and the amount of allocating resources from allocation numbers will be described below. FIGS. 5A and 5B are diagrams, each showing a specific example of an allocation number that specifies the frequency offset from a reference resource and the amount of resources to be allocated. In FIG. 5, allocation numbers 0 to 14 are selected by using the reference resource as the starting point.

Referring to FIG. 5A, for example, when the allocation number is "4," this allocation number is reported to a user terminal by using three bits ("100"). In FIG. 5A, the location of the resource corresponding to allocation number 0 is the relative coordinate, which descends the grid from the location of allocation number 4, to the lower left, down to the base. That is, the relative coordinate of allocation number 4 is "0." In this case, the amount of resources that meet the base part of the triangle, where allocation number 4 is the vertex (the resource corresponding to allocation number 0, which descends the grid from the location of allocation number 4, to the lower left, down to the base, the resource corresponding to allocation number 2, which descends the grid from the location of allocation number 4, to the lower right down to the base, and the resources between these resources (including the resources at both ends)) is the amount of resources to be allocated (=2).

Also, referring to FIG. 5B, when the allocation number is "14," this allocation number is reported to the user terminal by using four bits ("1110"). In FIG. 5B, the location of allocation number 6 is the relative coordinate, which descends the grid from the location of allocation number 14, to the lower left, down to the base. That is, the relative coordinate of allocation number 4 is "−2." In this case, the amount of resources that meet the base part of the triangle where allocation number 4 is the vertex is the amount of resources to be allocated (=5). That is, where the allocation number serves as the vertex of a triangular grid, the amount of resources to be allocated is defined by the number (total number) of grid points forming the base part of this triangular grid.

Figures 6A, 6B:
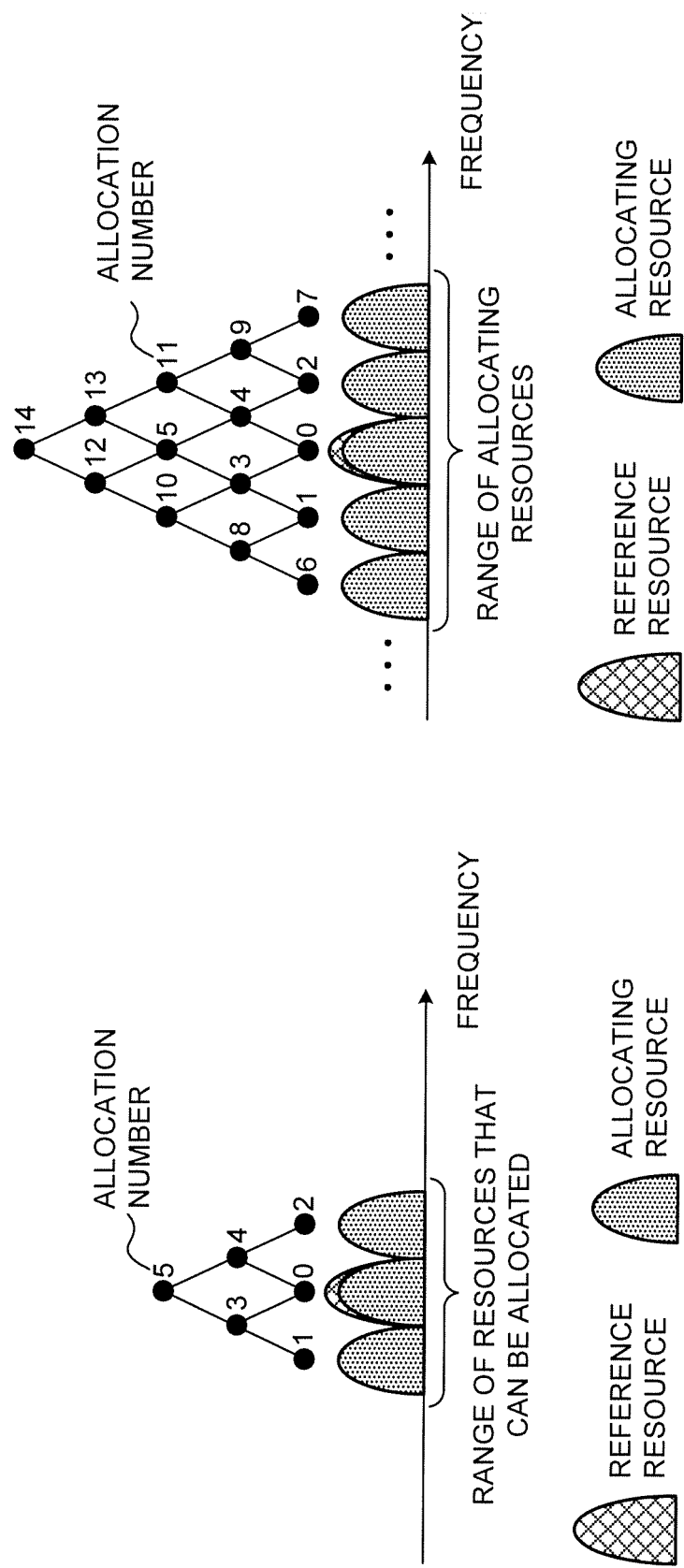
FIGS. 6A and 6B show specific examples of the relationship between allocation numbers and resources that can be allocated.

The total number of allocation numbers assigned to the grid points of the triangular grid described with reference to FIG. 5 is expressed as $X(X+1)/2$, where X is the range of resources that can be allocated. Now, with reference to FIG. 6, the relationship between allocation numbers and resources that can be allocated will be described below. FIGS. 6A and 6B show specific examples of the relationship between allocation numbers and resources that can be allocated. In FIG. 6A, the range of resources that can be allocated is "3." Thus, there are a total of six allocation numbers, and allocation numbers 0 to 5 are assigned by using the reference resource as the starting point, so that it is possible to specify which resources are allocated. In this case, a triangular grid is formed with the allocation numbers, with allocation number 5 being the vertex.

Furthermore, in FIG. 6B, the range of resources that can be allocated is "5." Thus, there are a total of fifteen allocation numbers, and allocation numbers 0 to 14 are assigned by using the reference resource as the starting point, so that it is possible to specify which resources are allocated. In this case, a triangular grid is formed with the allocation numbers, with allocation number 14 being the vertex. Thus, the wider the range of resources that can be allocated, the larger the number of allocation numbers that are required.

Figure 7:
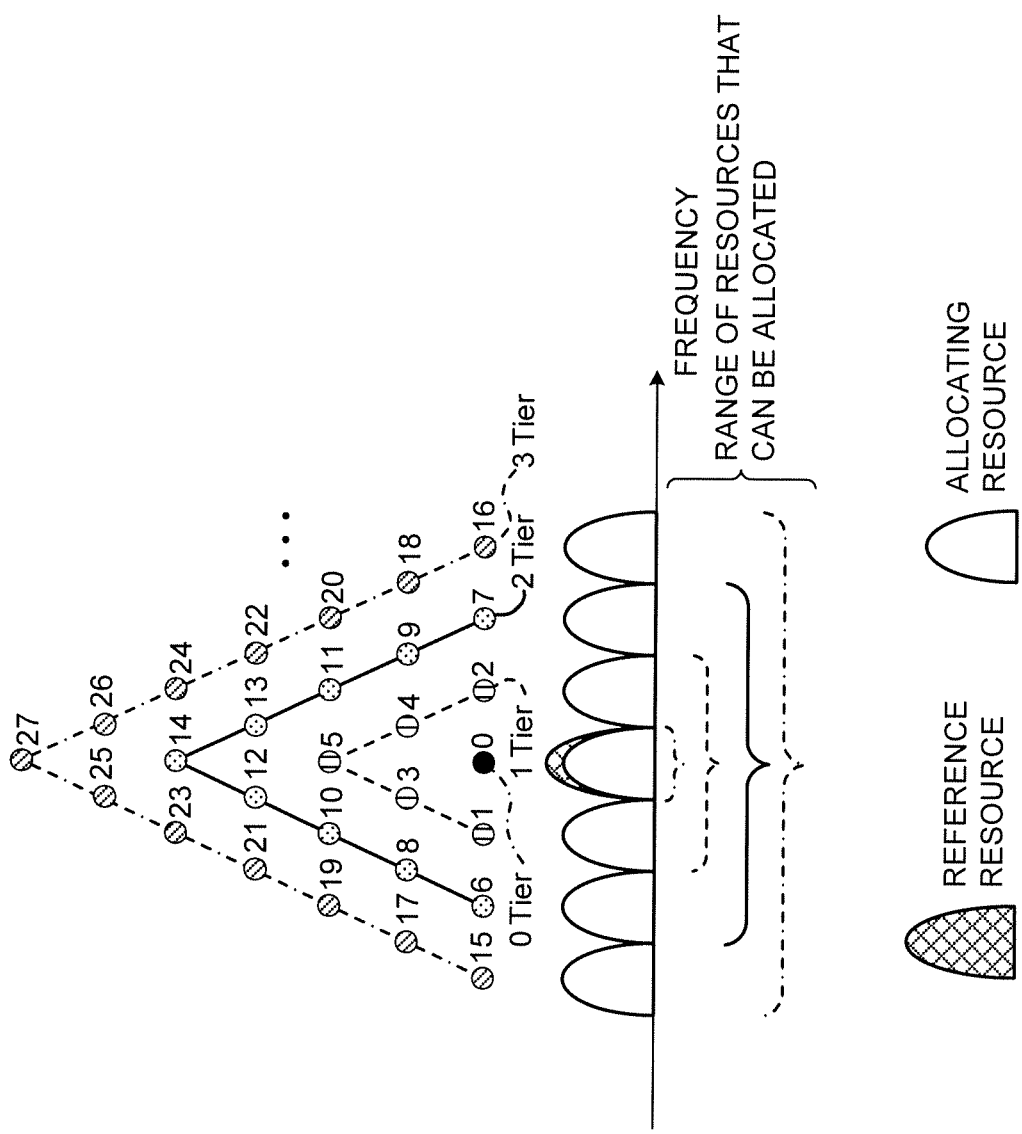
FIG. 7 is a diagram to show an example rule for selecting an allocation number.
Figure 9B:
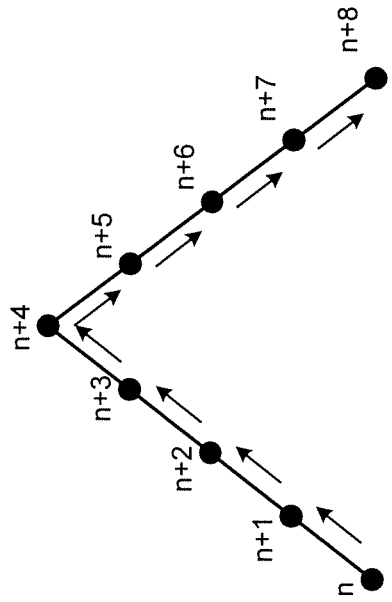
FIG. 9B is a diagram to show a rule for selecting an allocation number according to another example.
Figure 9A:
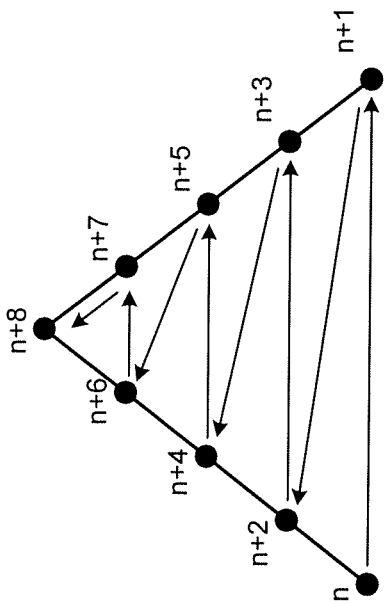
FIG. 9A is a diagram to show a rule for selecting an allocation number according to one aspect of the present invention.

Next, with reference to FIG. 7 to FIG. 9, rules for selecting allocation numbers will be described below. FIG. 7 is a diagram to show an example rule for selecting allocation numbers. FIG. 8 shows an example of a table, in which allocation numbers are provided per tier. FIG. 9A is a diagram to show the rule for selecting allocation numbers according to one aspect, and FIG. 9B is a diagram to show the rule for selecting allocation numbers according to another example.

In FIG. 7, allocation numbers 0 to 27 are provided by using the reference resource as the starting point. Allocation numbers 0 to 27 form a triangular grid, in which each side is a plurality of radio resources aligned in the frequency direction. This triangular grid has allocation number 27 as its vertex, and is formed to be symmetrical about the line connecting allocation numbers 0 and 27 in the frequency direction. In addition, this triangular grid has a layered structure in which allocation number 0 is located at the center. To be more specific, referring to the table shown in FIG. 8, as the distance from the reference resource increases in the frequency direction, a number of tiers, having mountain-like shapes, are formed.

In the example shown in FIG. 7, allocation numbers 0 to 27 are assigned to a total of four tiers. To be more specific, allocation number 0 belongs to tier 0, allocation numbers 1 to 5 belong to tier 1, allocation numbers 6 to 14 belong to tier 2, and allocation numbers 15 to 27 belong to tier 3. In this case, the amount of resources (=7) that meet the base part of the triangular grid, where allocation number 27 is the vertex, defines the range of resources that can be allocated.

To generalize this, as shown in FIG. 8, the allocation number where tier k starts and the allocation number where tier k ends are expressed as quadratic functions of k. To be more specific, in tier k, $k(2k−1)$ is determined to be the starting allocation number, and $k(2k+3)$ is determined to be the ending allocation number. Also, the number (total number) of allocation numbers is defined by the k-th term (=4k+1) of an arithmetic progression, where the initial term is 1 and the common difference is 4.

Now, the rule for selecting an allocation number in a given tier will be described below. With reference to FIG. 9, rules for selecting allocation numbers within tier 2 of FIG. 7 will be described below. In the example shown in FIG. 9A, the allocation numbers start at point n, which is the lower leftmost point of the triangular grid, and which increments to n+1 at the opposite location across the central allocation number (reference resource). Then, at the location that is opposite to n+1 across the central allocation number and that is one point above n, n+1 increments to n+2. This is repeated up to the vertex of the triangular grid, and allocation numbers are selected. By this means, in FIG. 9A, the allocation numbers from n to n+8 are selected.

Referring to the example shown in FIG. 9B, allocation numbers, starting at point n, which is the lowest point in the triangular grid, keep incrementing up to the vertex (from n to n+4), and then increments further (from n+5 to n+8) towards the lowest point of the triangular grid, which is opposite the location of the vertex across the central allocation number (reference resource), and, by this means, allocation numbers are selected. As a result of this, in FIG. 9B, again, allocation numbers n to n+8 are selected. Note that the rules for selecting allocation numbers illustrated in FIG. 9 are simply examples, and the rules for selecting allocation numbers are not limited to these.

Figures 10A, 10B:
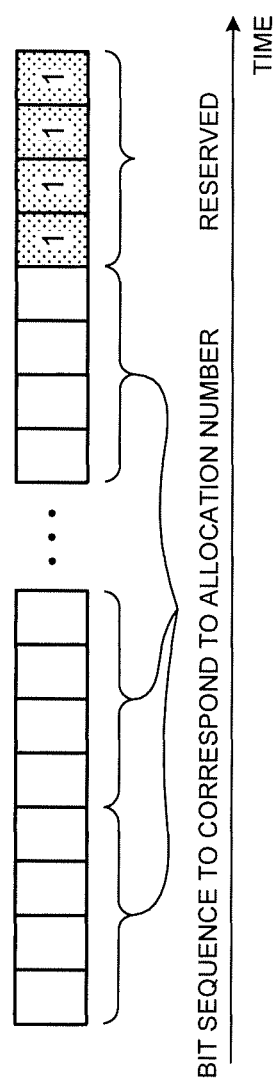
FIG. 10A is a diagram to show an example of reporting an allocation number.
FIG. 10B is a table to show examples of associations between allocation numbers and bit sequences.
Figure 11B:
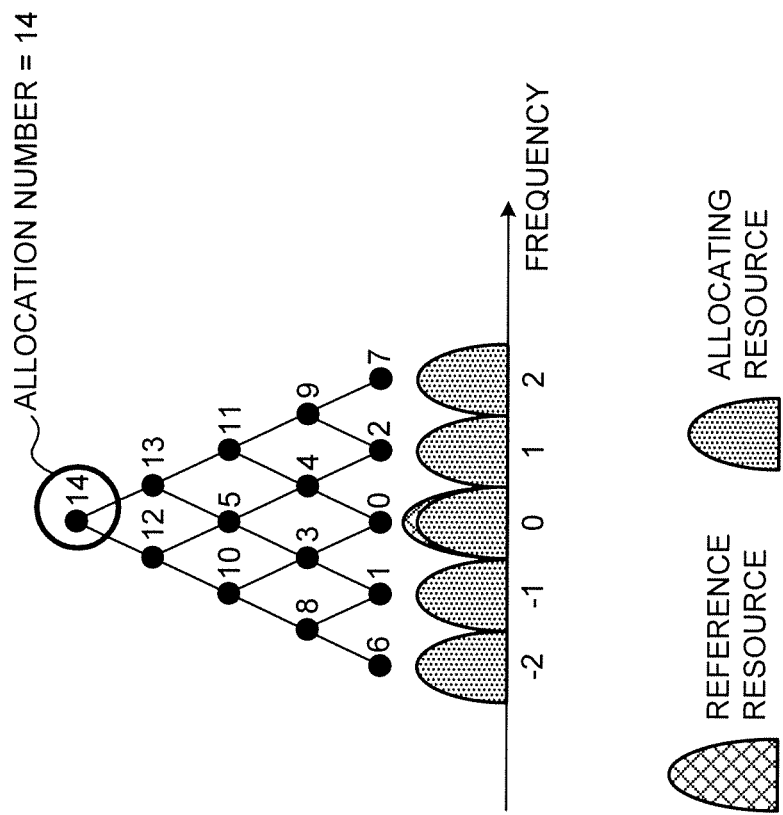
FIG. 11B is a diagram to show an example where a user terminal specifies allocating resources from an allocation number.
Figure 11A:
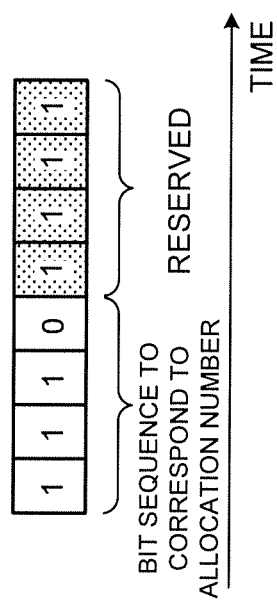
FIG. 11A is a diagram to show an example of an allocation number that is reported from a radio base station.

Next, with reference to FIG. 10 and FIG. 11, the method of reporting allocation numbers to user terminals will be described below. FIG. 10A is a diagram to show an example of reporting an allocation number, and FIG. 10B is a table to show associations between allocation numbers and bit sequences. FIG. 11A is a diagram to show an example of an allocation number that is reported from a radio base station, and FIG. 11B is a diagram to show an example where a user terminal specifies allocating resources from an allocation number.

FIG. 10 presume a case where an allocation number is transmitted to a user terminal by using a number of bits to match an integer multiple of a specific number, and where, following this allocation number, a specific bit sequence is transmitted. That is, the user terminal receives a bit sequence that includes a specific bit sequence at the end. The specific bit sequence here is a bit sequence for allowing the user terminal to learn that the bit sequence transmitted immediately before this specific bit sequence is a bit sequence to correspond to the allocation number (that a bit sequence other than the specific bit sequence represents the allocation number). Note that the specific bit sequence may be also referred to as a "reserved bit sequence (reserved bits)."

To be more specific, referring to FIG. 10A, the bit sequence that corresponds to the allocation number is constituted by a number of bits to match an integer multiple of (twice) four bits. Also, the reserved bit sequence is constituted by four bits. For example, as shown in FIG. 10B, the reserved bit sequence (reserved) can be expressed as "1111."

Note that the reserved bit sequence needs not be "1111," and other bit sequences can be used.

Given allocation numbers 0 to 14, the resource allocation can be reported to the user terminal by using a total of eight bits, comprised of the bit sequence corresponding to the allocation number (four bits) and the reserved bit sequence (four bits).

Also, if the allocation numbers are 15 to 29, the resource allocation can be reported to the user terminal by using a total of twelve bits, comprised of the bit sequence corresponding to the allocation number (eight bits) and the reserved bit sequence (four bits). Even if the allocation numbers assumes bigger values, the resource allocation can be reported in the same way.

Consider, for example, the case where, as shown in FIG. 11A, "11101111" is reported from the radio base station to the user terminal as a predetermined bit sequence. According to the table (associations) of FIG. 10B, when the user terminal receives the reserved bit sequence "1111," the user terminal can judge that the bit sequence "1110," located immediately before the reserved bit sequence, is the allocation number of radio resources. That is, the user terminal can judge that the allocation number is "14."

Then, as shown in FIG. 11B, based on this allocation number 14, the user terminal can judge that the relative coordinate of allocating resources in the frequency direction with respect to the reference resource is "−2" and the amount of allocating resources is "5."

As described above, a specific bit sequence is transmitted following a bit sequence that represents the allocation number, so that the user terminal can identify the allocation number even when the number of reporting bits varies depending on the size of allocation numbers. Note that the "specific number" and the "specific bit sequence" described above may be determined based on the specification, or may be reported to the user terminal through higher layer signaling, physical layer signaling (for example, DCI), or a combination of these.

As described above, according to embodiment 1.2, specifying information (allocation number) that relates to allocation of radio resources can be reported by using a number of bits that represent allocation numbers, which are independent of the system bandwidth. In particular, the closer the radio resources that are allocated, to the reference resource (the smaller the allocation number and/or the tier), the fewer the bits that are needed to report the specifying information.

Note that, in the examples illustrated above, rules regarding allocation numbers have been explained on assumption that the "left side" and the "right side" are the lower side and the higher side in the frequency direction, but this is by no means limiting. For example, rules regarding allocation numbers in which these are reversed may be used as well.

Variation of Embodiment 1.2

Next, another example of embodiment 1.2 will be described below with reference to FIG. 12. FIG. 12A is a diagram to show an example where the resource allocation method shown in FIG. 10 is applied to resource groups (RGs), which bundle a number of resources. FIG. 12B is a table to show examples of associations between RG numbers and bit sequences, and FIG. 12C is a diagram to show an example of an RG number that is reported from the radio base station.

In the examples shown in FIG. 12, the allocation numbers in embodiment 1.2 are replaced by resource group numbers (RG numbers). That is, in FIG. 12, RG numbers are the specifying information. Note that the resource groups here may be the same as resource block groups (RBGs) that are defined in existing LTE systems, or may be groups comprised of different units.

In FIG. 12A, five resource groups (RGs) are arranged side by side in the frequency direction, each bundling five radio resources. Here, among the five RGs, the RG at the center in the frequency direction is RG #0, and the RGs that are larger than RG #0 in the frequency direction are RG #+1 and RG #+2, in ascending order. Meanwhile, the RGs that are smaller than RG #0 in the frequency direction are RG #−2 and RG #−1, in ascending order.

Furthermore, in FIG. 12A, the central radio resource in RG #0 is selected as the reference resource. In this case, the relative coordinates of each radio resource of RG #−2 to RG #+2 can be expressed as −12 to 12, with respect to the reference resource as the starting point (=0).

In addition, RG numbers can be constituted by two bits minimum. For example, as shown in FIG. 12B, RG number=0 (RG #0) can be expressed as "00," RG number=1 (RG #+1) as "01," and RG number=−1 (RG #-1) as "10." In this case, the reserved bit sequence can be expressed as "11." Note that the bit sequences to represent RG numbers need not be two bits, and can be changed as appropriate depending on the number of RGs.

Consider, for example, the resource allocation when RG number=1 is reported to a user terminal. In this case, as shown in FIG. 12C, a predetermined bit sequence "0111" is reported from the radio base station to the user terminal. Based on the associations set forth in FIG. 12B, the user terminal can judge that the bit sequence "01," located immediately before the received reserved bit sequence "11," is the RG number.

By this means, the user terminal can judge that the RG number is "1." As a result of this, based on the RG number=1, the user terminal can judge that the relative coordinate of allocating resources in the frequency direction with respect to the reference resource is "3," and that the amount of allocating resources is "5."

In this way, in FIG. 12, again, information related to allocation of radio resources (RG numbers) can be reported by using a number of bits that represent RG numbers, which are independent of the system bandwidth. Also, a reserved bit sequence is transmitted following the RG number bit sequence, so that the user terminal can determine the RG number and the allocation of resources. Note that the closer the radio resources that are allocated, to the reference resource (the smaller the RG number), the fewer the bits that are needed to report the information related to allocation of radio resources (RG numbers).

Although cases have been described above with the embodiments illustrated in FIG. 10 to FIG. 12 where a reserved bit sequence is transmitted following a bit sequence that specifies an allocation number or an RG number, this is by no means limiting, and can be changed as appropriate. For example, as shown in FIG. 13, the user terminal may estimate the bit sequence that specifies the allocation number or the RG number, by measuring the received power, without using a reserved bit sequence.

Figures 13A, 13B:
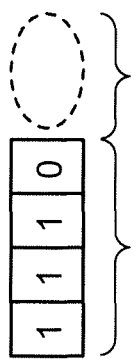
FIG. 13A is a diagram to show an example of reporting an allocation number without using a reserved bit sequence.
FIG. 13B is a table to show examples of associations between allocation numbers and bit sequences.

FIG. 13A is a diagram to show an example where the allocation number is reported without using a reserved bit sequence, and FIG. 13B is a table to show associations between allocation numbers and bit sequences. With reference to FIG. 13, a case will be considered here where nothing is transmitted after the bit sequence corresponding to the allocation number. Note that, although the reserved bit sequence is expressed as "1111" in FIG. 10 and FIG. 11, no reserved bit sequence is used in FIG. 13, so that allocation number 15 can be expressed as "1111" instead (see FIG. 13B).

As shown in FIG. 13A, "1110" is transmitted from the radio base station to the user terminal as the bit sequence to correspond to the allocation number, and nothing is transmitted after that. In this case, the user terminal measures the received power, and learns that there is a period where nothing is transmitted. Consequently, the user terminal can judge that the bit sequence located immediately before the period nothing is transmitted represents the allocation number. That is, the user terminal can judge that the allocation number is "14." By this means, the redundant bits to allow the user terminal to learn the allocation number are no longer necessary, so that the efficiency of communication can be improved.

A case has been described with FIG. 13 where a user terminal receives an allocation number as information for specifying the relative coordinates of radio resources and the amount of allocating resources, but this is by no means limiting. Cases where the user terminal receives RG numbers as information to specify the relative coordinates of radio resources and the amount of allocating resources are equally applicable.

Second Embodiment

Figure 14:
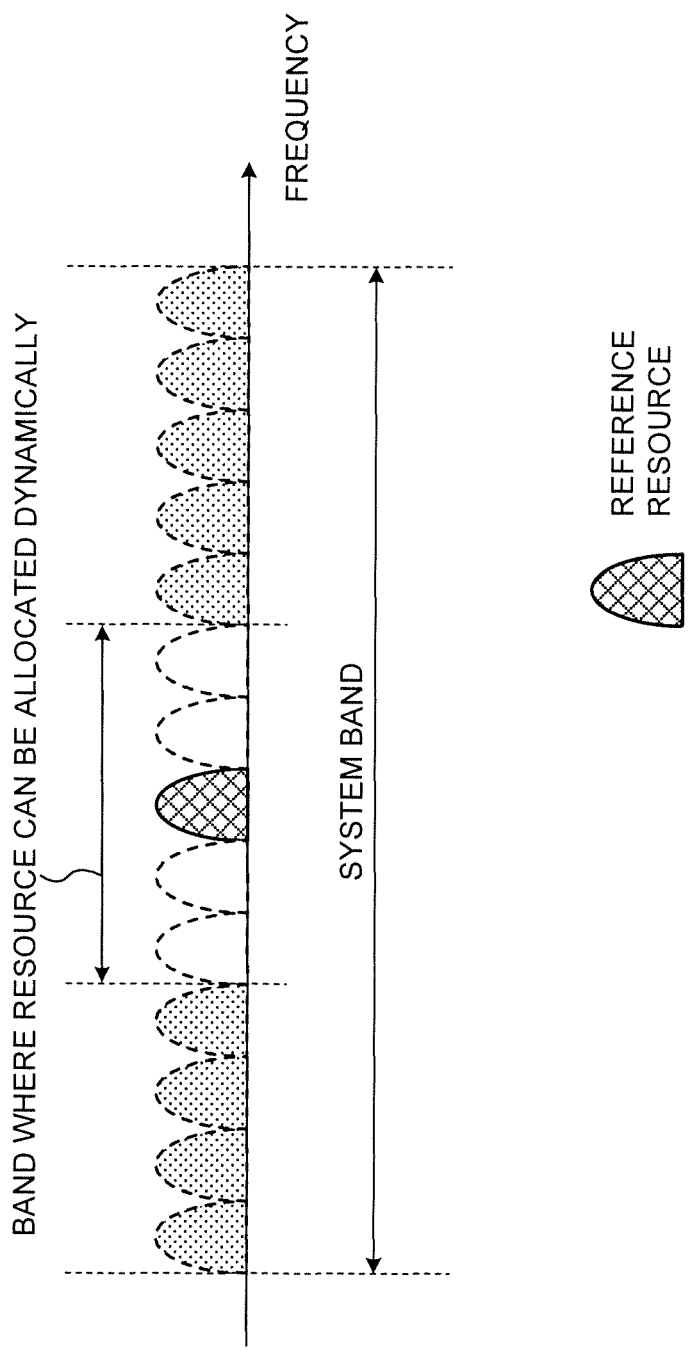
FIG. 14 is a diagram to show an example of the method of allocating resources according to a second embodiment of the present invention.

Next, a second embodiment of the present invention will be described below. FIG. 14 is a diagram to show an example of the method of allocating resources according to the second embodiment. While the first embodiment is designed so that resources to allocate are not limited, and the whole system band is the band where dynamic resource allocation is allowed, the second embodiment presumes, by contrast, as shown in FIG. 14, limiting the band in the system band where resources can be allocated, and allocating all the radio resources to user terminals semi-statically. According to the second embodiment, the radio base station can allocate specific radio resources within the system band to a user terminal on a dynamic basis. Note that the second embodiment can be divided further based on the contents of the above-mentioned specifying information, its reporting method, and so forth (embodiments 2.1 to 2.3).

Embodiment 2.1

Figures 15A, 15B:
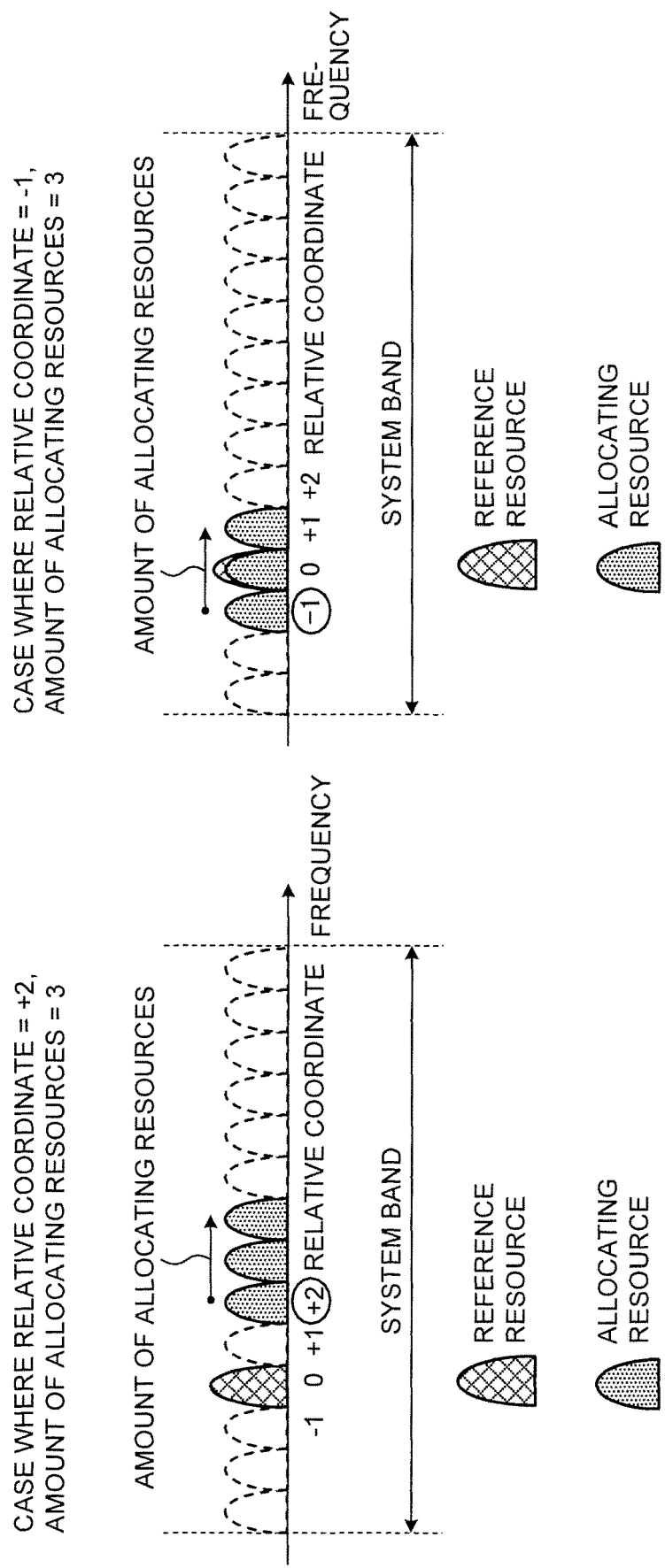
FIGS. 15A and 15B are diagrams to show examples of resource allocation methods for use when allocating limited resources.

With reference now to FIG. 15 and FIG. 16, embodiment 2.1 will be described below. FIGS. 15A and 15B are diagrams to show examples of resource allocation methods for use when allocating limited resources. FIG. 16A is a table to show examples of associations between the relative coordinates and the bit sequences shown in FIG. 15, and FIG. 16B is a table to show examples of associations between the amounts of allocating resources and the bit sequences shown in FIG. 15.

According to embodiment 2.1, the number of bits to constitute specifying information (information about the relative coordinates of radio resources and/or the amount of allocating resources) related to allocation of resources is reported to a user terminal in advance through higher layer signaling (for example, RRC signaling, system information, and so forth). The user terminal performs processes of receiving and decoding physical layer control information (for example, DCI) by using the reported number of bits. That is, based on the reported number of bits, the user terminal can acquire information related to relative coordinates and/or information related to the amount of resources that are allocated, contained in the physical layer control information.

To be more specific, in FIG. 15, the relative coordinate is reported in two bits, and the amount of resources to be allocated is reported in two bits. In this case, the relative coordinate is expressed in four patterns, namely "0," "+1," "−1," and "+2," as shown in FIG. 16A. Similarly, the amount of the allocating resources is expressed in four patterns, 1 to 4, as shown in FIG. 16B.

Now, for example, consider the case where the relative coordinate is reported using the bit sequence "11" and the amount of allocating resources is reported using the bit sequence "10." In this case, as shown in FIG. 15A, the user terminal can judge that the relative coordinate from the reference resource is "+2" and the amount of allocating resources is "3."

Also, if the relative coordinate is reported using the bit sequence "10" and the amount of allocating resources is reported using the bit sequence "10," as shown in FIG. 15B, the user terminal can judge that the relative coordinate from the reference resource is "−1" and the amount of allocating resources is "3."

In this way, according to embodiment 2.1, the number of bits for reporting relative coordinates and the amount of allocating resources is fixed, so that, although there are only limited variations of relative coordinates and allocating resources, it is still possible to report relative coordinates and allocating resources to user terminals, on a dynamic basis, within the range of limited variations. This allows resources to be allocated without increasing the number of bits.

Note that the associations shown in FIGS. 16A and 16B are examples, and by no means limiting. For example, information related to associations between relative coordinates and bit sequences, information related to associations between the amounts of allocating resources and bit sequences, and so forth may be reported to UE through, for example, high layer signaling. The UE may update these associations based on the information reported. Furthermore, the number of bits to be reported in advance is not limited to two bits, and can be changed as appropriate.

Embodiment 2.2

Figures 17A, 17B:
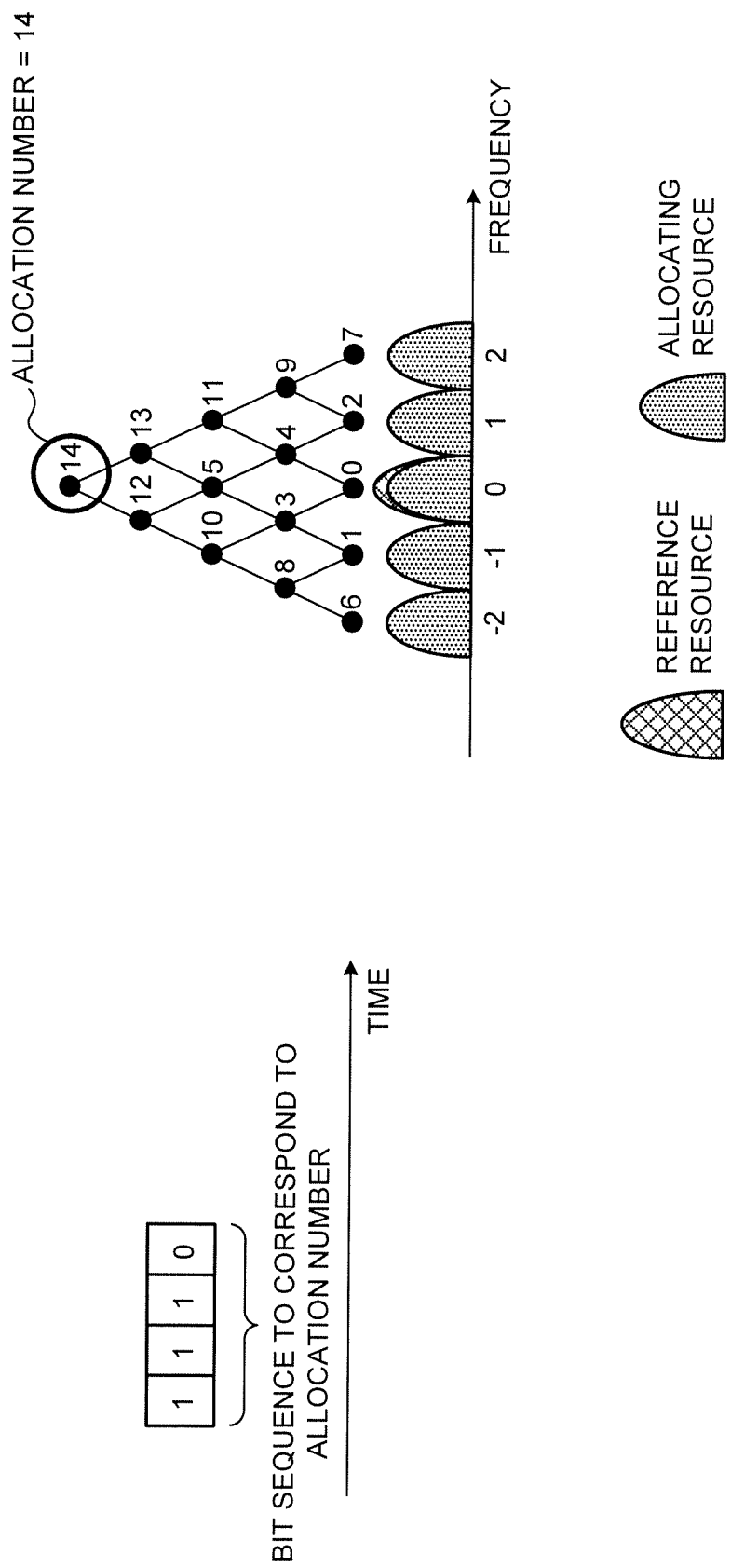
FIG. 17A is a diagram to show an example of an allocation number that is reported from a radio base station when allocating limited resources.
FIG. 17B is a diagram to show an example where a user terminal specifies allocating resources from an allocation number.
Figures 18A, 18B:
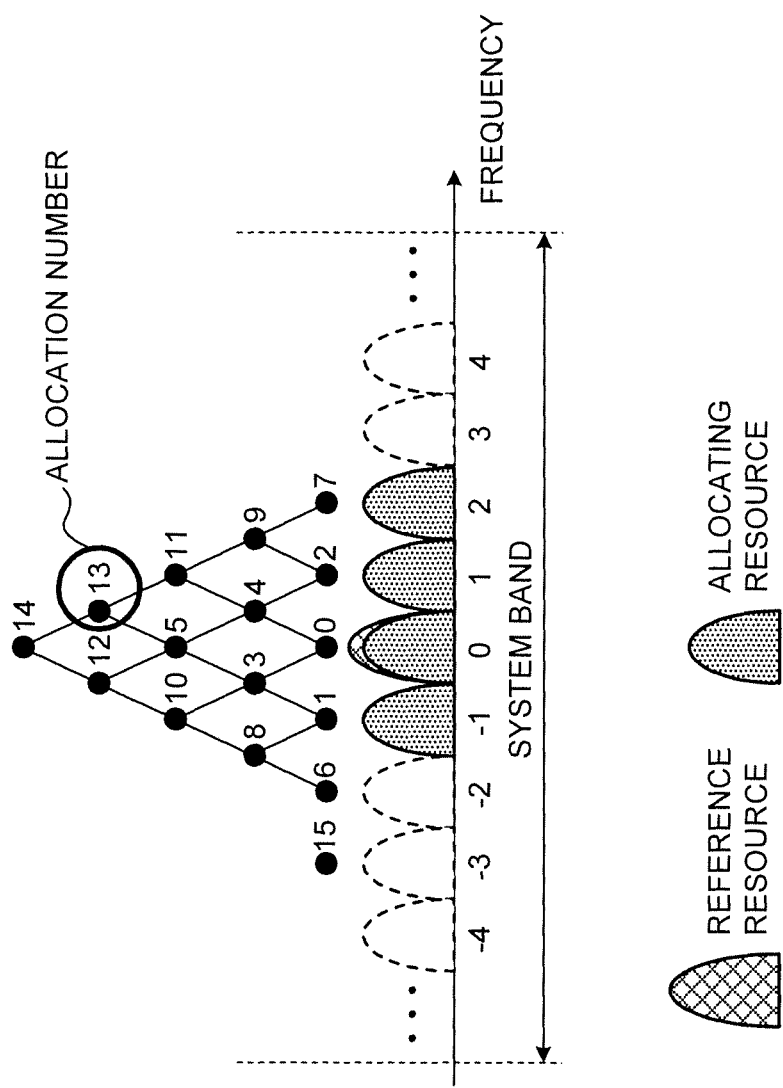
FIG. 18A is a diagram to show another example of a resource allocation method for use when allocating limited resources.
FIG. 18B is a table to show examples of associations between allocation numbers and bit sequences.

Next, with reference to FIG. 17 and FIG. 18, embodiment 2.2 will be described below. FIG. 17A is a diagram to show an example of an allocation number that is reported from the radio base station when allocating limited resources, and FIG. 17B is a diagram to show an example where a user terminal specifies allocating resources from an allocation number. FIG. 18A is a diagram to show another example of the resource allocation method for use when allocating limited resources, and FIG. 18B is a table to show examples of associations between allocation numbers and bit sequences.

According to embodiment 2.2, the number of bits that constitute specifying information (allocation numbers) is reported in advance through higher layer signaling (for example, RRC signaling, system information, and so forth), and, by using these bits, an allocation number, which specifies the relative coordinate of radio resources and the amount of allocating resources, are reported to the user terminal.

Assume that, for example, the user terminal is informed in advance that the number of bits to represent an allocation number is four bits. As shown in FIG. 17A, when "1110" is reported from the radio base station to the user terminal as the bit sequence to represent an allocation number, the user terminal, knowing that it takes to four bits to transmit an allocation number, can interpret the bit sequence "1110" as the allocation number of radio resources. That is, the user terminal can judge that the allocation number is "14."

Then, as shown in FIG. 17B, the user terminal can judge, based on allocation number 14, that the relative coordinate of allocating resources in the frequency direction with respect to the reference resource is "−2," and that the amount of allocating resources is "5." In this way, according to embodiment 2.2, the number of bits to represent the allocation number is reported to a user terminal in advance, allowing the user terminal to identify the allocation number in a reliable manner.

Note that, as shown in FIG. 10B, the allocation number may be determined based on associations that are set forth by taking into account a reserved bit sequence as shown in FIG. 10B, or may be determined on assumption that there is no reserved bit sequence, as shown in FIG. 18. In this case, no reserved bit sequence is provided in the table to show examples of associations between allocation numbers and bit sequences, so that allocation number 15 is expressed as "1111," as in FIG. 13B (see FIG. 18B).

For example, if "1101" is reported from the radio base station to the user terminal as a bit sequence to represent an allocation number, the user terminal, thinking that no reserved bit sequence is present, can interpret the bit sequence "1101" as the allocation number of radio resources. That is, the user terminal can judge that the allocation number is "13."

Then, as shown in FIG. 18A, the user terminal can judge, based on allocation number 13, that the relative coordinate of resources to be allocated in the frequency direction with respect to the reference resource is "−1," and that the amount of allocating resources is "4." In this case, there is no overhead of reserved bits, so that the efficiency of communication can be improved.

Embodiment 2.3

Figure 19:
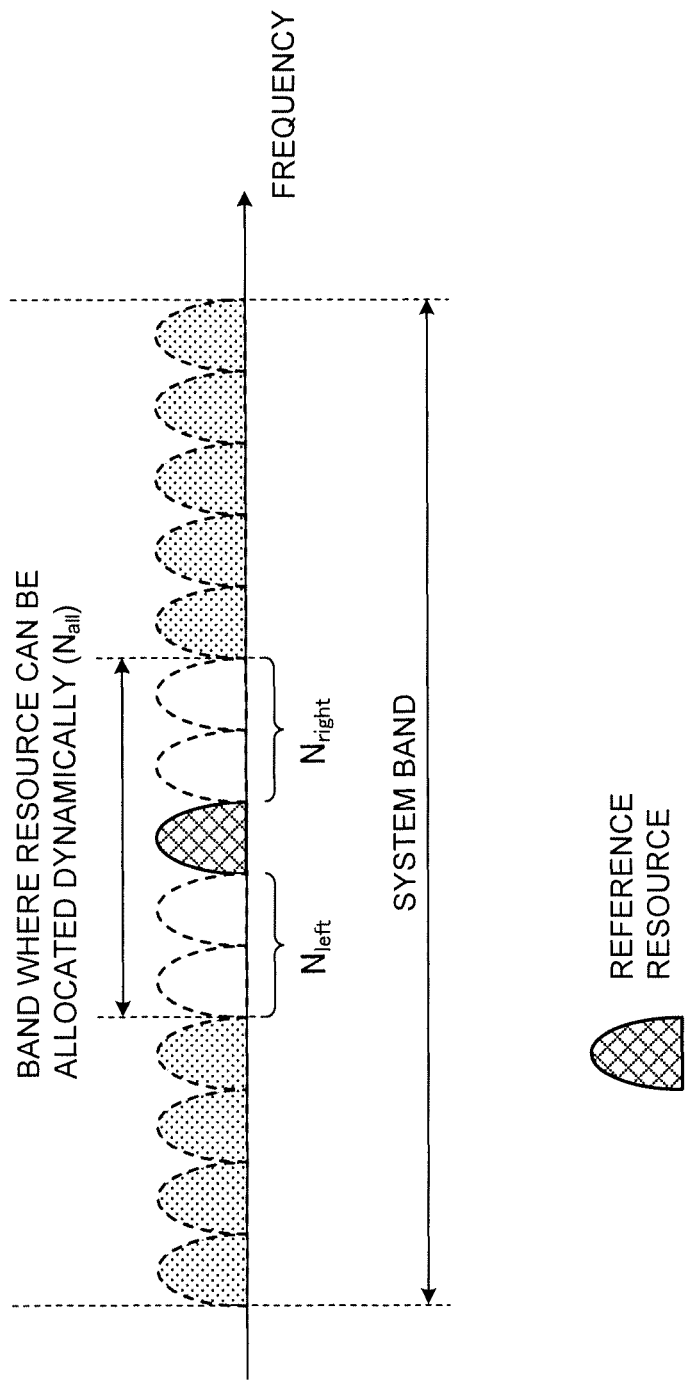
FIG. 19 is a diagram to show an example of reporting a band where resources can be allocated.

Next, with reference to FIG. 19, embodiment 2.3 will be described below. FIG. 19 is a diagram to show an example of reporting a band in which resources can be allocated.

According to embodiment 2.3, in which band resources can be allocated is reported through higher layer signaling (for example, RRC signaling, system information, and so forth). A user terminal can estimate the number of bits to constitute specifying information, which is reported in physical layer control information, by using the band-related information reported.

Assume that, for example, as shown in FIG. 19, $N_{left}$ is a predetermined number of resources that are lower than the reference resource in the frequency direction, and $N_{right}$ is a predetermined number of resources that are higher in the reference resource in the frequency direction. In this case, let $N_{all}$ be the band where resources can be allocated on a dynamic basis, then $N_{all}$ is expressed by following equation 3:

$$N_{all}=N_{left}+N_{right}+1 \quad \text{(Equation 3)}$$

When reporting in which band resources can be allocated ($N_{all}$), the radio base station may report $N_{all}$ calculated by equation 3, to a user terminal, on an as-is basis. Alternatively, the radio base station may configure $N_{left}$ and $N_{right}$ separately, and report information representing each to the user terminal. Furthermore, the radio base station may report one common value, which makes $N_{left}=N_{right}$, to the user terminal. For example, if $N_{left}=N_{right}=2$, the user terminal can judge that the allocation number is reported in four bits.

Note that, according to embodiment 2.3, when the band in which resources can be allocated is reported to the user terminal, above-described embodiments 2.1 to 2.2 can be applied as specific methods of resource allocation. In addition, resource allocation types 0, 1, 2 and/or others in existing LTE may be used. When using existing resource allocation methods, $N_{all}$ corresponds to $N_{RB}$ in equation 1 or equation 2.

Third Embodiment

Next, a third embodiment of the present invention will be described below. With the third embodiment, methods of selecting reference resources will be described below. Note that the third embodiment can be divided further based on the method of selecting a reference resource (embodiments 3.1 to 3.2).

Embodiment 3.1

Figure 20:
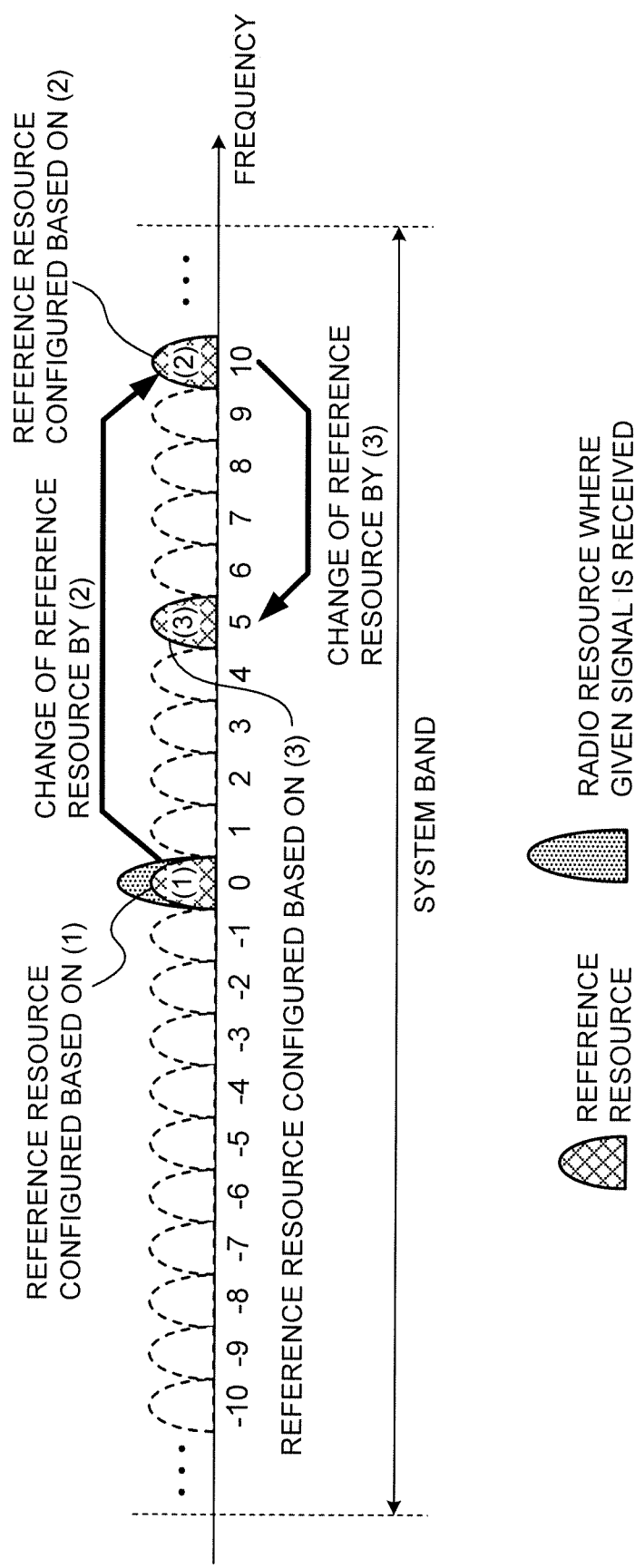
FIG. 20 is a diagram to show examples of methods of selecting a reference resource (third embodiment)

With reference now to FIG. 20, embodiment 3.1 will be described below. FIG. 20 is a diagram to show examples of methods of selecting a reference resource (third embodiment). Embodiment 3.1 assumes that reference resources are selected based on certain rules that are set forth in advance. To be more specific, reference resources are selected based on at least one of the following three rules:

(1) A user terminal configures the radio resource, where a predetermined signal such as a synchronization signal (SS) is received, as the reference resource;

(2) When a change of the reference resource is reported in system information such as broadcast information, the user terminal configures the reported radio resource as the reference resource; and (3) When the reference resource is reported independently via higher layer signaling and so on, the user terminal configures the reported radio resource as the reference resource.

Now, as shown in FIG. 20, consider the case where a user terminal configures the radio resource in which a predetermined signal such as an SS is received as the reference resource according to the rule of (1). Below, assume that the relative coordinate of each radio resource is represented with respect to the location of the reference resource as the starting point (=0).

For example, in accordance with the rule of (2), when the radio resource with the relative coordinate "10" is reported as the reference resource to change to, in system information such as broadcast information, the user terminal configures the radio resource with the relative coordinate "10" as the new reference resource.

Furthermore, when the radio resource with the relative coordinate "5" is reported as the reference resource through higher layer signaling and so on, the user terminal configures the radio resource with the relative coordinate "5" as the new reference resource.

As described above, according to embodiment 3.1, reference resources can be selected based on predetermined rules (1) to (3) described above. Note that, in the downlink, the radio resource where a predetermined signal is received may be the radio resource (PRB (Physical RB)) in which the DC-SC (Direct Current Sub-Carrier) is included.

Embodiment 3.2

Next, with reference to FIG. 21, embodiment 3.2 will be described below. FIG. 21A is a diagram to show another example of the method of selecting a reference resource, and FIG. 21B is a table to show examples of associations between the resource numbers of candidate reference resources and the information to be reported.

According to embodiment 3.2, a radio resource that is indicated by given reporting information is selected from a limited number of candidate reference resources, as the reference resource. Note that candidate reference resources may be configured by higher layer signaling, or may be configured based on certain rules that are determined in advance. In addition, the reporting information may be reported through physical layer signaling (for example, DCI) or may be reported through higher layer signaling.

Figures 21A, 21B:
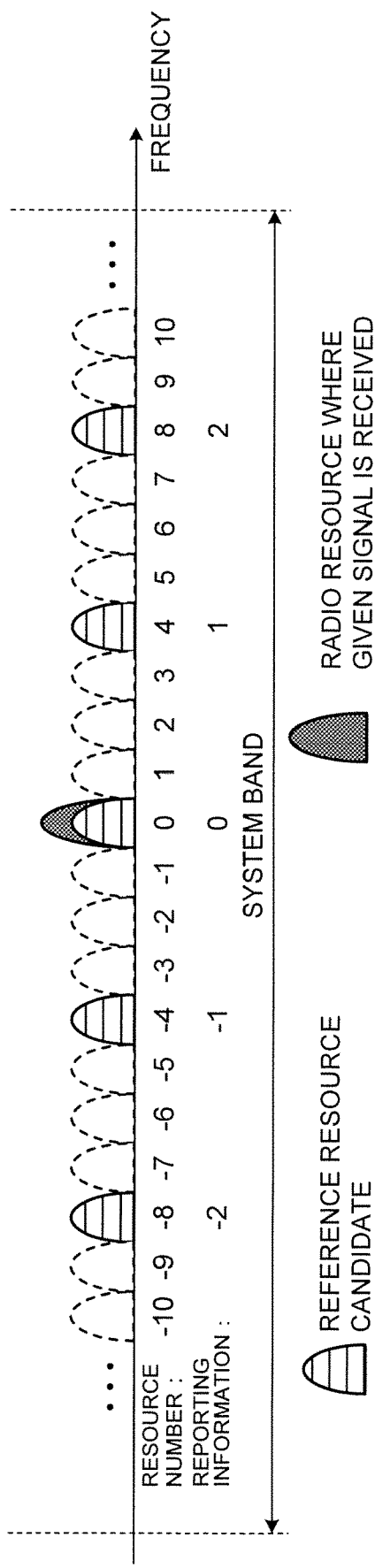
FIG. 21A is a diagram to show another example of the method of selecting a reference resource.
FIG. 21B is a table to show examples of associations between resource numbers of candidate reference resources and reporting information.

Now, as shown in FIG. 21A, consider a case where candidate reference resources are configured at given intervals of resource numbers (coordinate intervals) based on the radio resource where a given signal is received. Each radio resource is assigned a resource number (relative coordinate in the frequency direction) with respect to the radio resource where a given signal is received, as the starting point (=0).

In FIG. 21A, candidate reference resources are configured at intervals of four resource numbers. Also, candidate numbers, which start from the radio resource where a given signal is received (=0) and which serve as reporting information, are assigned to each reference resource candidate. The associations between the resource numbers of candidate reference resources and the information to be reported (candidate numbers) are as shown in FIG. 21B. For example, the radio resource with resource number "4" is associated with "1" as reporting information.

For example, if "2" is reported as reporting information from the radio base station to the user terminal, the user terminal configures the radio resource having the resource number "8," amongst the candidate reference resources, as the reference resource.

In this way, according to embodiment 3.2, it is possible to select a reference resource from a limited number of candidate reference resources, based on information that is reported. Note that the given interval of resource numbers may be determined in the specification, or may be reported from the radio base station to the user terminal via higher layer signaling (for example, RRC signaling, system information, and so forth).

Also, although the third embodiment has been described based on examples of the downlink, the third embodiment is equally applicable to the uplink. For example, according to embodiment 3.1, the user terminal can select (1) the radio resource (PRB) where the center frequency of the system band is accommodated, (2) the central resource (PRB) of random access channel (PRACH (Physical Random Access Channel)) transmission resource, or (3) the resource (PRB) with the same resource number as the DL reference resource, as the reference resource.

In the event of (2), the PRACH resource can be identified based on broadcast information and so forth. As described above, in the uplink, too, the user terminal may select a reference resource based on predetermined rules, or select the reference resource designated by the radio base station. Furthermore, as in the downlink, the user terminal can transmit data, control information and so forth in allocated radio resources.

Fourth Embodiment

Next, a fourth embodiment of the present invention will be described below. With the fourth embodiment, examples will be described below in which methods of resource allocation according to the present invention are applied to interlacing allocation methods. Note that the fourth embodiment can be divided further based on what information is reported (embodiments 4.1 to 4.2).

Embodiment 4.1

Figure 22:
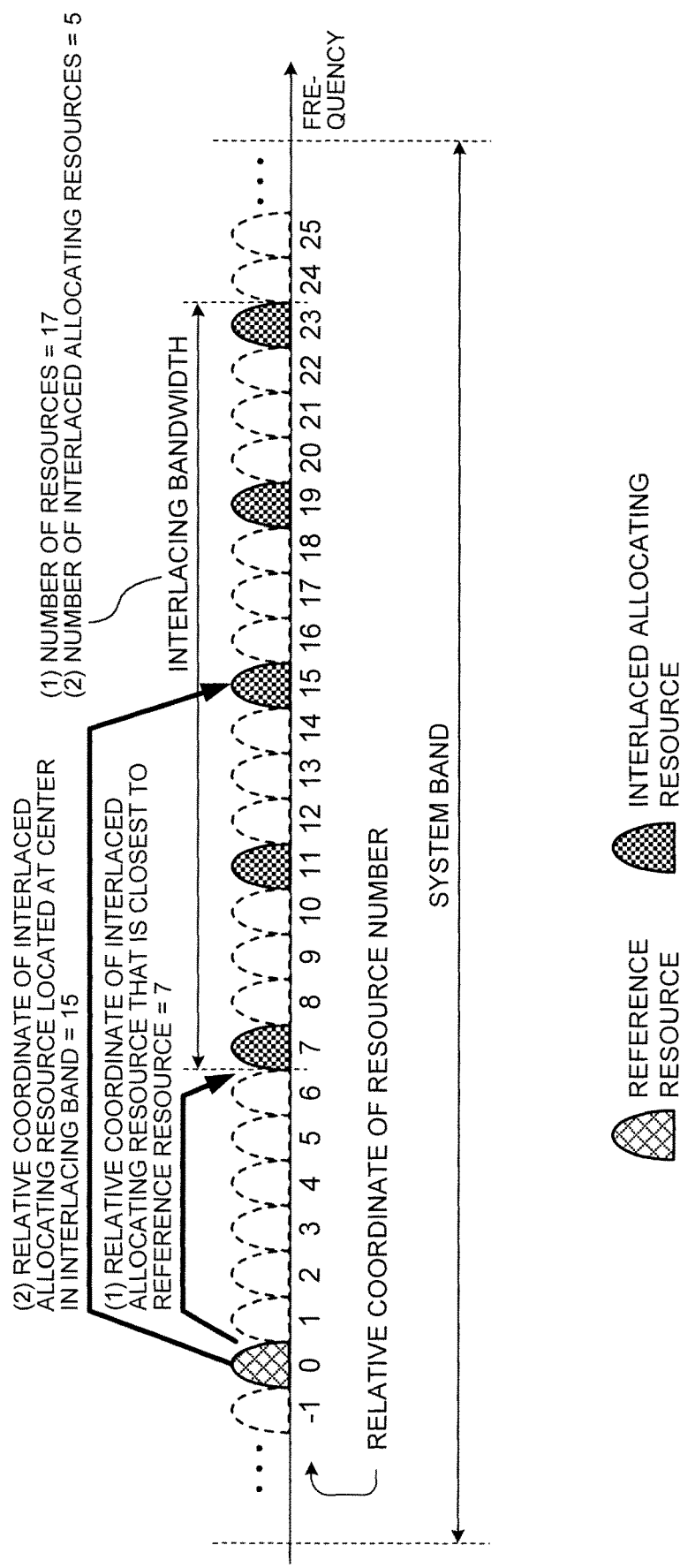
FIG. 22 is a diagram to show an example of the method of allocating resources according to a fourth embodiment of the present invention.

With reference now to FIG. 22, embodiment 4.1 will be described below. FIG. 22 is a diagram to show an example of the method of allocating resources according to the fourth embodiment. With embodiment 4.1, resource allocation to use radio resources that are arranged at intervals (that is, interlaced resource allocation) will be described below.

As shown in FIG. 22, resource numbers (relative coordinates in the frequency direction) are assigned to each radio resource, starting from the reference resource (=0). Also, in FIG. 22, five interlaced allocating resources are configured in total, at intervals of four resource numbers (the interval of interlacing is 3).

In embodiment 4.1, the relative coordinate and the bandwidth that is subject to interlacing are reported from the radio base station to a user terminal, and, based on the relative coordinate and the interlacing bandwidth, the user terminal identifies the resources to be allocated.

FIG. 22 shows examples of relative coordinates to be reported, and (1) the relative coordinate ("7" in FIG. 22) of the interlaced allocating resource that is closest to the reference resource can be reported to the user terminal. Another example is that (2) the relative coordinate ("15" in FIG. 22) of the interlaced allocating resource at the center in the interlacing band may be reported to the user terminal. In this case, either the relative coordinate of (1) or the relative coordinate of (2) may be reported, or both (1) and (2) may be reported.

As an example of reporting the bandwidth that is subject to interlacing, (1) the total number ("17" in FIG. 22) of radio resources included in the interlacing bandwidth can be reported to the user terminal. Furthermore, as another example, (2) the total number ("5" in FIG. 22) of interlaced allocating resources included in the interlacing bandwidth may be reported to the user terminal. In this case either (1) or (2) may be reported, or (1) and (2) may be both reported.

In this way, according to embodiment 4.1, the resources to allocate can be specified based on the relative coordinate and the bandwidth that is subject to interlacing. Note that the user terminal performs receiving and decoding processes on assumption that data will be transmitted in allocated radio resources. Also, as in the third embodiment, the relative coordinate with respect to the reference resource and the bandwidth that is subject to interlacing may be configured according to predetermined rules, reported through higher layer signaling, or designated by physical layer control information from among a plurality of candidates. Furthermore, as in embodiment 1.2, the user terminal may assume that the number of transmitting bits varies depending on what value is reported.

Embodiment 4.2

Figure 23:
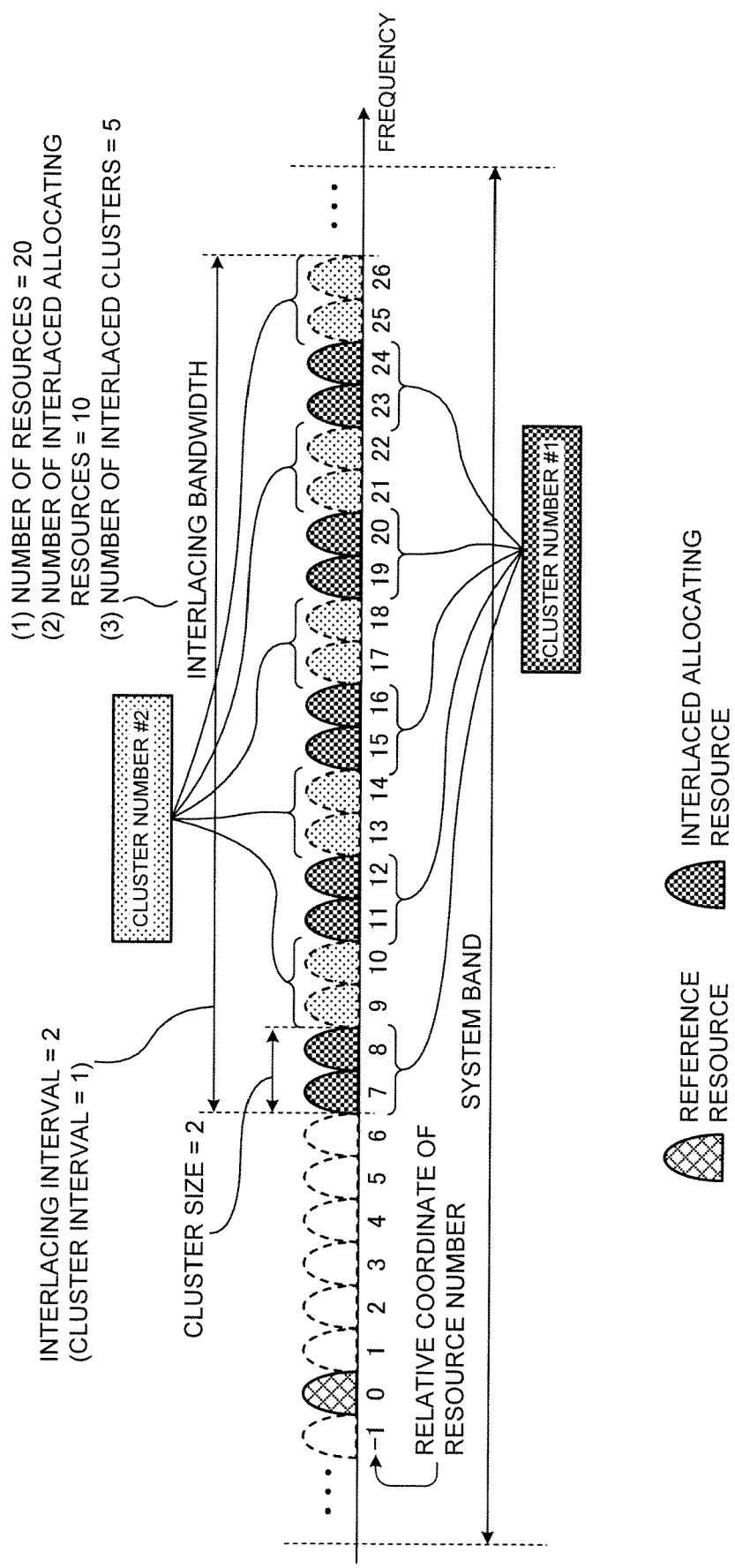
FIG. 23 is a diagram to show another example of the resource allocation method according to the fourth embodiment.
Figure 24:
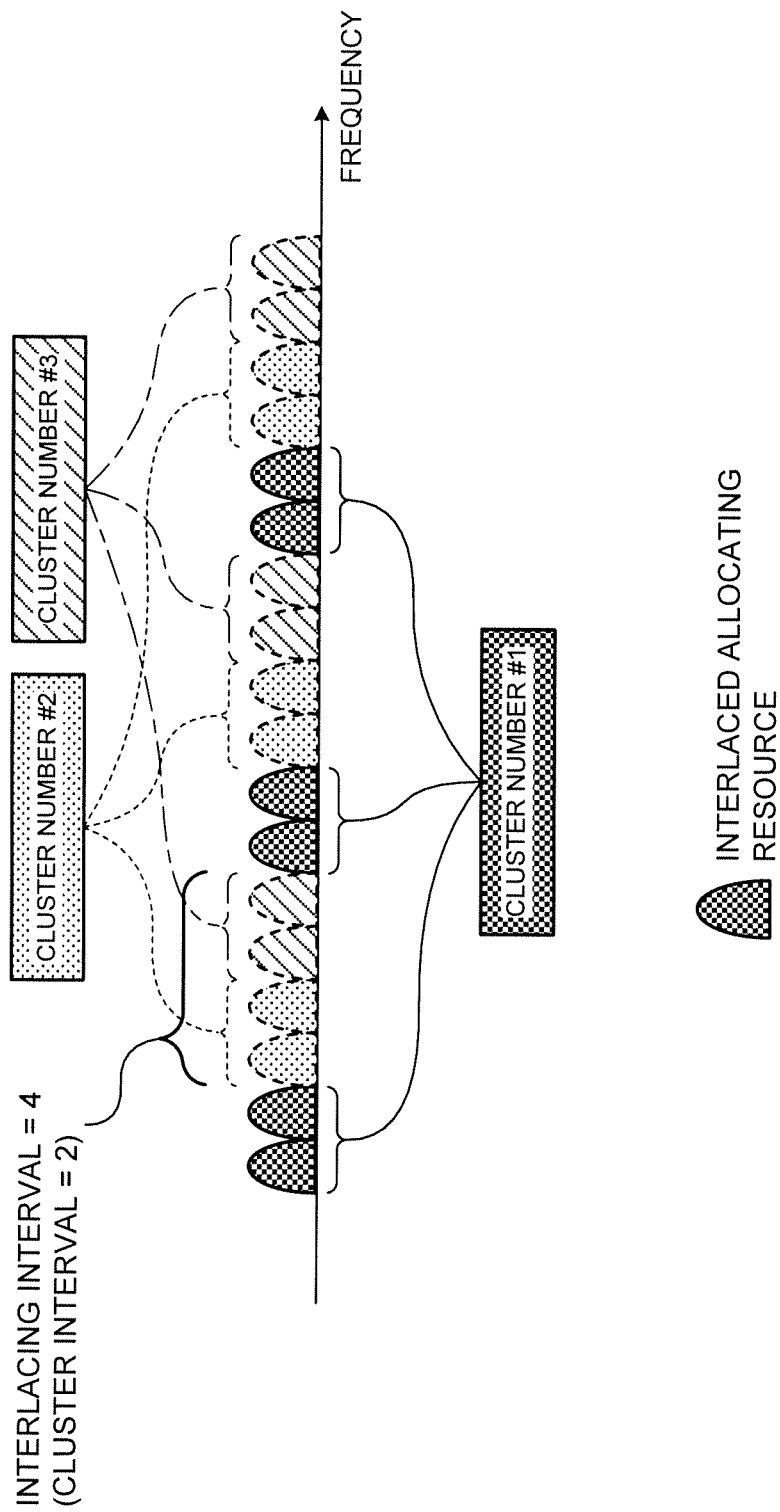
FIG. 24 is a diagram to show another specific example of FIG. 23.

Now, with reference to FIG. 23 and FIG. 24, embodiment 4.2 will be described below. FIG. 23 is a diagram to show another example of the resource allocation method according to the fourth embodiment. FIG. 24 is a diagram to show another specific example of FIG. 23.

While, according to embodiment 4.1, the bandwidth that is subject to interlacing is reported as described above, embodiment 4.2 is designed so that the interlacing interval (which may be referred to as the "cluster interval"), cluster size, cluster number and so on may be reported.

As shown in FIG. 23, resource numbers (relative coordinates in the frequency direction) are assigned to each radio resource, starting from the reference resource (=0). In addition, in FIG. 23, a number of interlaced allocating resources of given cluster size are configured at predetermined interlacing intervals (cluster intervals). Note that, hereinafter, a set of consecutive interlaced allocating resources will be referred to as a "cluster (interlaced cluster)."

To be more specific, in FIG. 23, the cluster size is configured to 2 (that is, the number of consecutive interlaced allocating resources is 2), the interlacing interval is configured to 2 (that is, the cluster interval is 1), and the total number of interlaced allocating resources is configured to 10 (that is, the number of interlaced clusters is 5). In this case, two adjoining interlaced allocating resources are cluster number #1, and two adjoining radio resources included within the interlacing interval are cluster number #2.

In the example shown in FIG. 24, the cluster size is configured to 2, and the interlacing interval is configured to 4 (that is, the cluster interval is 2). In this case, two adjoining interlaced allocating resources are cluster number #1. Among where four radio resources included within the interlacing interval, the two smaller radio resources in the frequency direction are cluster number #2, and the two larger radio resources in the frequency direction are cluster number #3. As described above, it is possible to specify the bandwidth that is subject to interlacing.

As shown in FIG. 23, as an example of reporting the interlacing bandwidth, (1) it is possible to report the total number ("20" in FIG. 22) of radio resources included in the interlacing bandwidth to a user terminal. Another example is that (2) the total number ("10" in FIG. 23) of interlaced allocating resources included in the interlacing band may be reported to a user terminal. Yet another example is that (3) the total number ("5" in FIG. 23) of interlaced clusters included in the interlacing band may be reported to a user terminal.

In this case, one of (1) to (3), two of (1) to (3) or all of (1) to (3) may be reported. In addition to (1) to (3), the cluster size ("2" in FIG. 23), cluster numbers ("#1" or "#2" in FIG. 23), and so on may be further reported.

In this way, similar to embodiment 4.1, according to embodiment 4.2, resources that are allocated can be specified based on relative coordinates and the bandwidth that is subject to interlacing. As in embodiment 4.1, relative coordinates with respect to the reference resource and the bandwidth that is subject to interlacing may be configured based on predetermined rules, reported through higher layer signaling, or designated by physical layer control information out of a number of candidates. Also, the interval of interlacing, the cluster size and so forth may be reported in system information such as broadcast information. The cluster number may also be reported in the same way as in embodiment 4.1.

Also, the cluster number may be reported to the user terminal in one value, or whether resource candidates reported in advance through higher layer signaling are allocated or not may be reported to the user terminal by using bitmap (0 or 1). Also, when bitmap is reported, multiple cluster numbers can be assigned to a user terminal. Note that a "cluster numbers" as used in the above description may be read as an "interlace number" for specifying interlacing.

Although embodiments have been described above independently of one another, these embodiments can be combined as appropriate. For example, it is possible to switch the interlacing allocation methods described in the fourth embodiment above and the allocation methods described in the first and second embodiments (which may be referred to as "localized allocation"), by using higher layer control information.

For example, a user terminal may report capability information (capability) as to whether the user terminal is compatible with interlacing allocation, to the radio base station. Furthermore, when no higher layer control information is received, the user terminal can judge that localized allocation is configured.

According to the embodiments described above, a user terminal determines the allocation of radio resources based on the relative coordinate of radio resources in the frequency direction with respect to a reference resource, and the amount of radio resources that are allocated, so that the number of control information bits for resource allocation can be determined regardless of the system bandwidth. By this means, resources can be allocated adequately even in the kind of broadband communication anticipated in 5G.

(Variations)

Figure 25B:
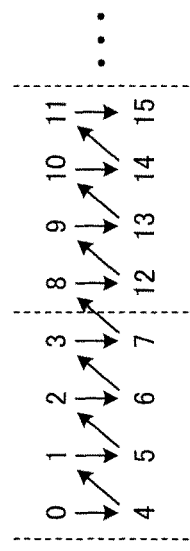
FIG. 25B is a diagram to show an example of rearrangement of resource numbers.
Figure 25A:
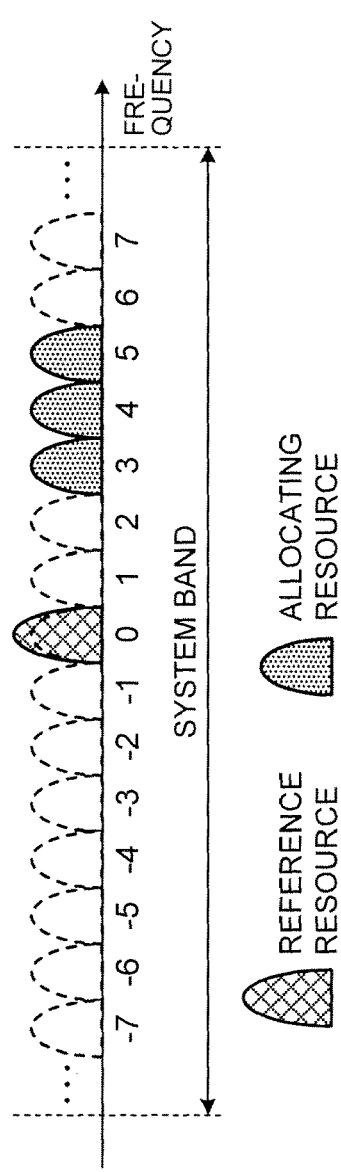
FIG. 25A is a diagram to show resources before being rearranged.
Figure 25C:
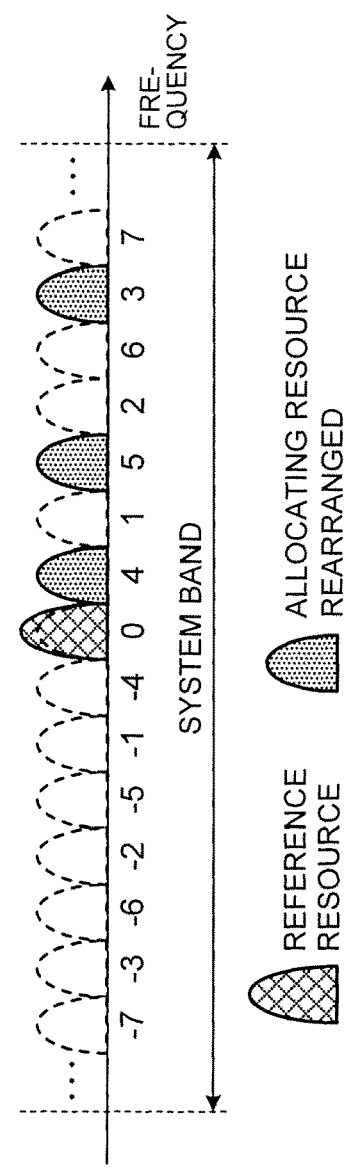
FIG. 25C is a diagram to show resources after being rearranged.

Now, with reference to FIG. 25, an example will be described below, where rearranging of resources is applied to a resource allocation method in accordance with the present invention. FIG. 25A is a diagram to show resources before being rearranged, FIG. 25B shows an example of rearrangement of resource numbers, and FIG. 25C is a diagram to show resources after being rearranged.

In each embodiment described above, "allocating resources" or "resource numbers (relative coordinates)" may be allocated to actual resources, or may be allocated to radio resource that are different from the actual ones through rearranging process (such as interleaving, hopping, virtual allocation, and so forth).

Referring to FIG. 25A, an example of allocation in which the relative coordinate with respect to the reference resource is "3" and the amount of allocating resources is "3" will be described below. In FIG. 25A, virtual resource numbers (relative coordinates) are assigned in the frequency direction, in ascending order, starting from the reference resource (=0). Here, based on the predetermined rule shown in FIG. 25B, the allocating resources can be rearranged (distributed and allocated), as shown in FIG. 25C. In FIG. 25B, virtual resource numbers arranged in ascending order from 0 to 15 are rearranged in order of 0, 4, 1, 5, 2, 6, 3, 7, 8, 12, 9, 13, 10, 14, 11 and 15.

As described above, by applying rearrangement of resources to a resource allocation method that is based on the present invention, it is possible to achieve a frequency diversity effect.

Figure 26:
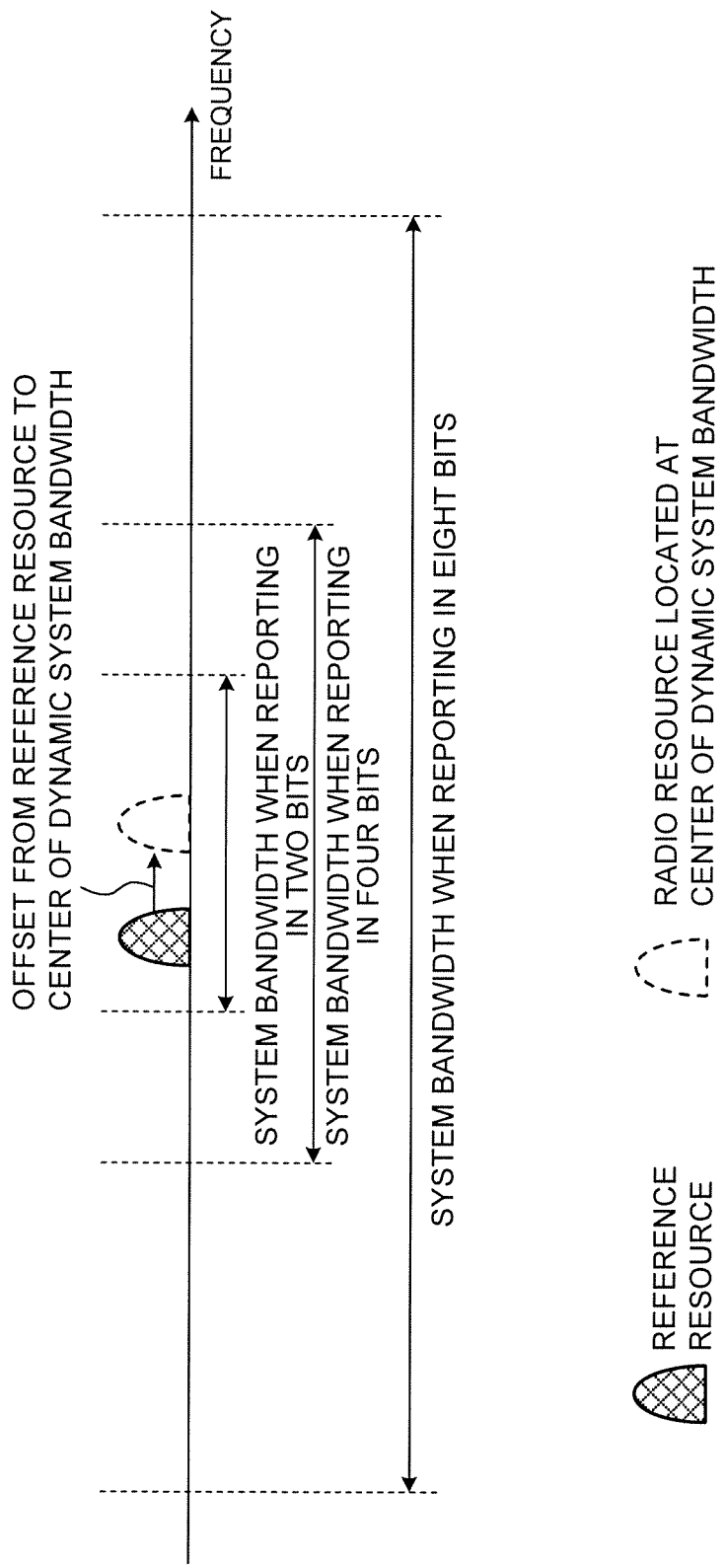
FIG. 26 is a diagram to show an example where the present invention is applied to expansion of system bandwidth.
Figure 27:
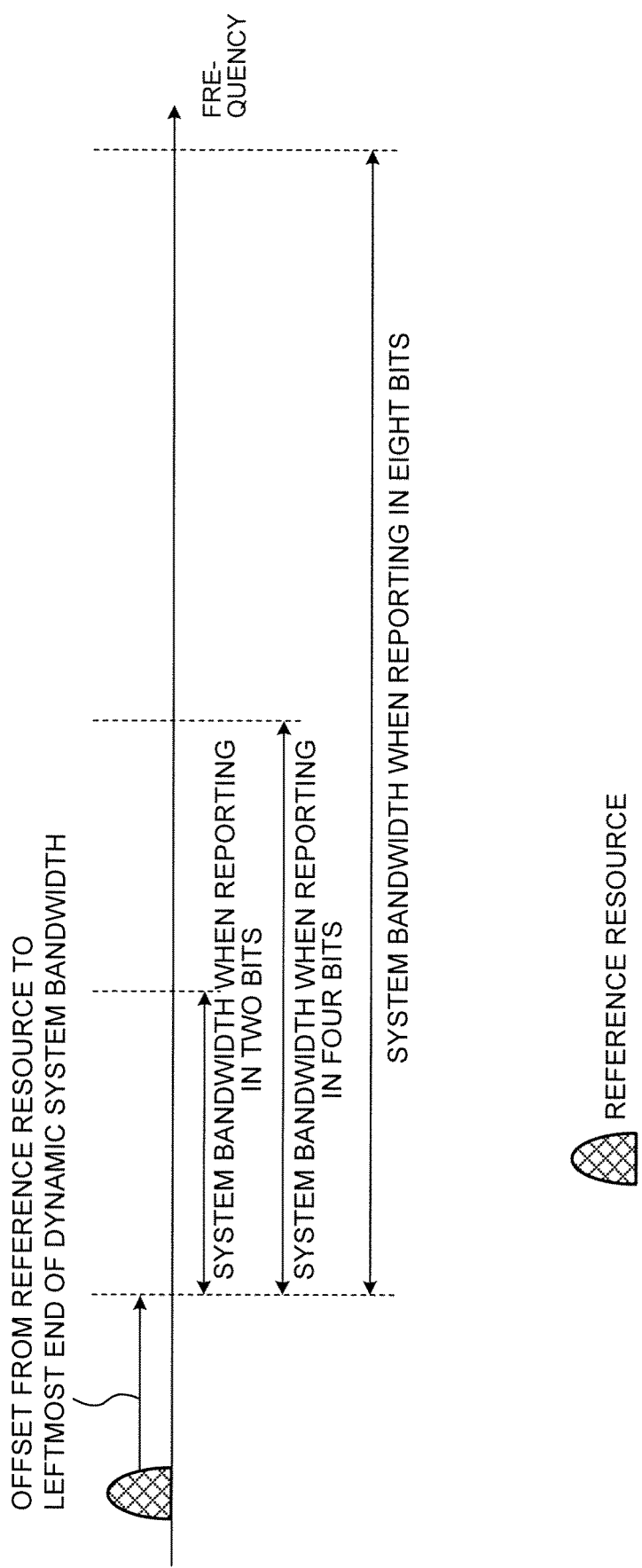
FIG. 27 is a diagram to show another example of FIG. 26.

Next, with reference to FIG. 26 and FIG. 27, an example of using a resource allocation method in accordance with the present invention to expand the system bandwidth will be described below. FIG. 26 is a diagram to show an example where the present invention is used to expand the system bandwidth. FIG. 27 is a diagram to show another example of FIG. 26.

In the example shown in FIG. 26 and FIG. 27, "dynamic system bandwidth," in which the system bandwidth changes dynamically depending on the number of bits which the radio base station uses to report resource allocation will be described below.

As shown in FIG. 26 and FIG. 27, based on the reference resource, the bandwidth in which resource allocation can be reported is configured as the dynamic system bandwidth. In this case, while resource allocation is reported in two bits in this system bandwidth, the system bandwidth is expanded dynamically as the number of reporting bits increases (for example, to four bits or to eight bits).

Furthermore, the reference resource may be located at the center of the dynamic system bandwidth, or may be offset from the center of the dynamic system bandwidth by a predetermined amount, as shown in FIG. 26. In this case, the relative coordinate (frequency offset) from the reference resource to the center of the dynamic system bandwidth may be reported via higher layer signaling, or may be determined in the specification in advance.

Furthermore, as shown in FIG. 27, the reference resource may be located outside the dynamic system bandwidth (outside the lowest end (leftmost end) or the highest end (rightmost end) of the dynamic system bandwidth in the frequency direction). In this case, the relative coordinate (frequency offset) from the reference resource to the end (the leftmost end or the rightmost end) of the dynamic system bandwidth may be reported through higher layer signaling, or may be determined in the specification in advance.

Thus, with the variations shown in FIG. 26 and FIG. 27, the system bandwidth is changed dynamically depending on the number of bits used to report resource allocation, so that it is possible to improve the flexibility of control.

(Radio Communication System)

Now, the structure of the radio communication system according to one embodiment of the present invention will be described below. In this radio communication system, communication is performed using one or a combination of the radio communication methods according to the herein-contained embodiments of the present invention.

Figure 28:
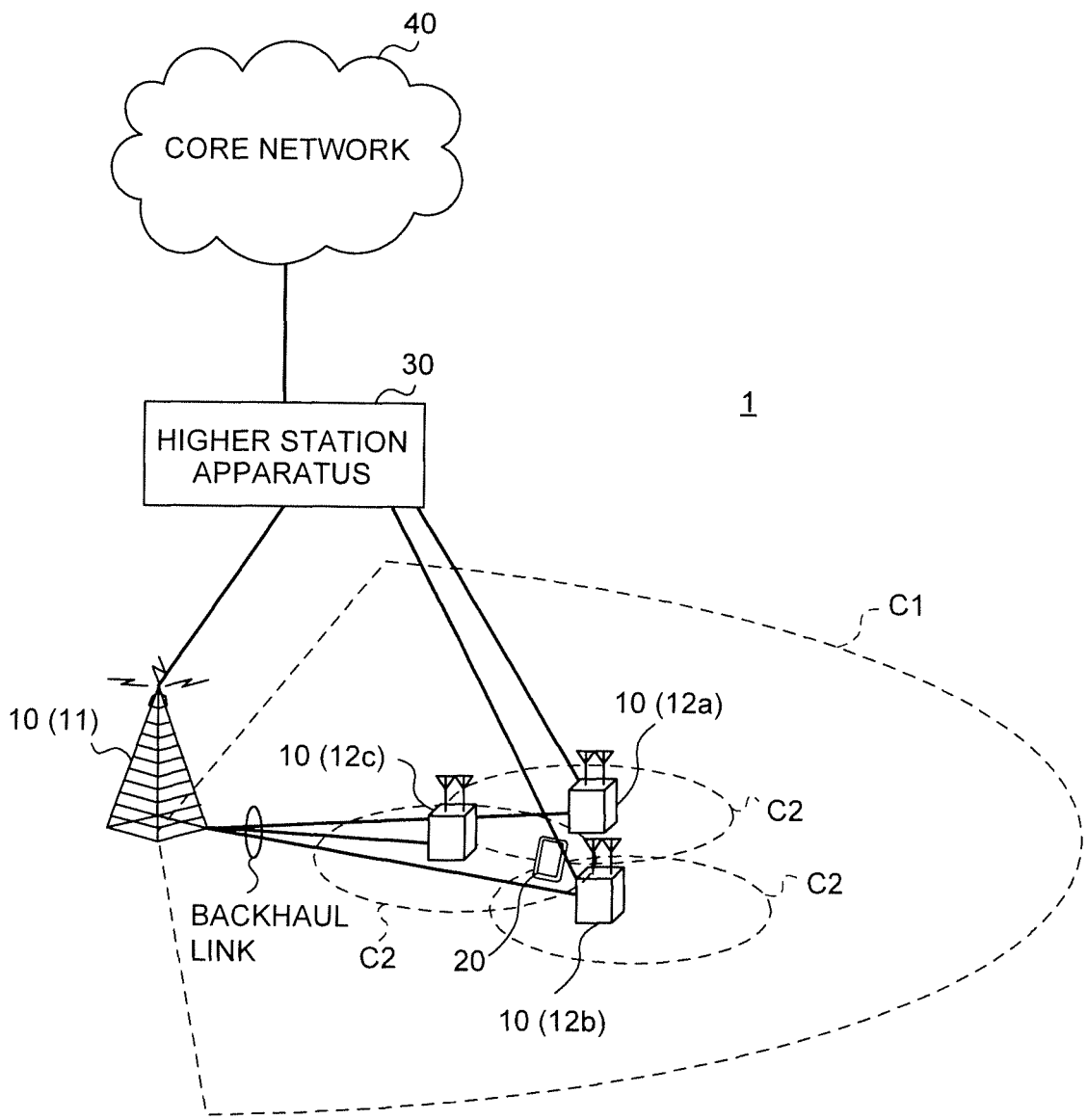
FIG. 28 is a diagram to show an example of a schematic structure of a radio communication system according to one embodiment of the present invention.

FIG. 28 is a diagram to show an example of a schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G, "IMT-Advanced," "4G (4th generation mobile communication system)," "5G (5th generation mobile communication system)," "FRA (Future Radio Access)," "New-RAT (Radio Access Technology)" and so on, or may be seen as a system to implement these.

The radio communication system 1 includes a radio base station 11 that forms a macro cell C1, which has a relatively wide coverage, and radio base stations 12 (12a to 12c) that are placed within the macro cell C1 and that form small cells C2, which are narrower than the macro cell C1. Also, user terminals 20 are placed in the macro cell C1 and in each small cell C2. The arrangement of cells and user terminals 20 is not limited to that shown in the drawing.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base stations 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) is applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to this combination, and other radio access schemes may be used as well.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACK," "ACK/NACK," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data, higher layer control information and so on are communicated by the PUSCH. Also, downlink radio quality information (CQI (Channel Quality Indicator)), delivery acknowledgement information and so on are communicated by the PUCCH. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRS (Sounding Reference Signal)), demodulation reference signal (DMRS) and so on are communicated as uplink reference signals. Note that the DMRS may be referred to as a "user terminal-specific reference signal (UE-specific Reference Signal)." Also, the reference signals to be communicated are by no means limited to these.

(Radio Base Station)

Figure 29:
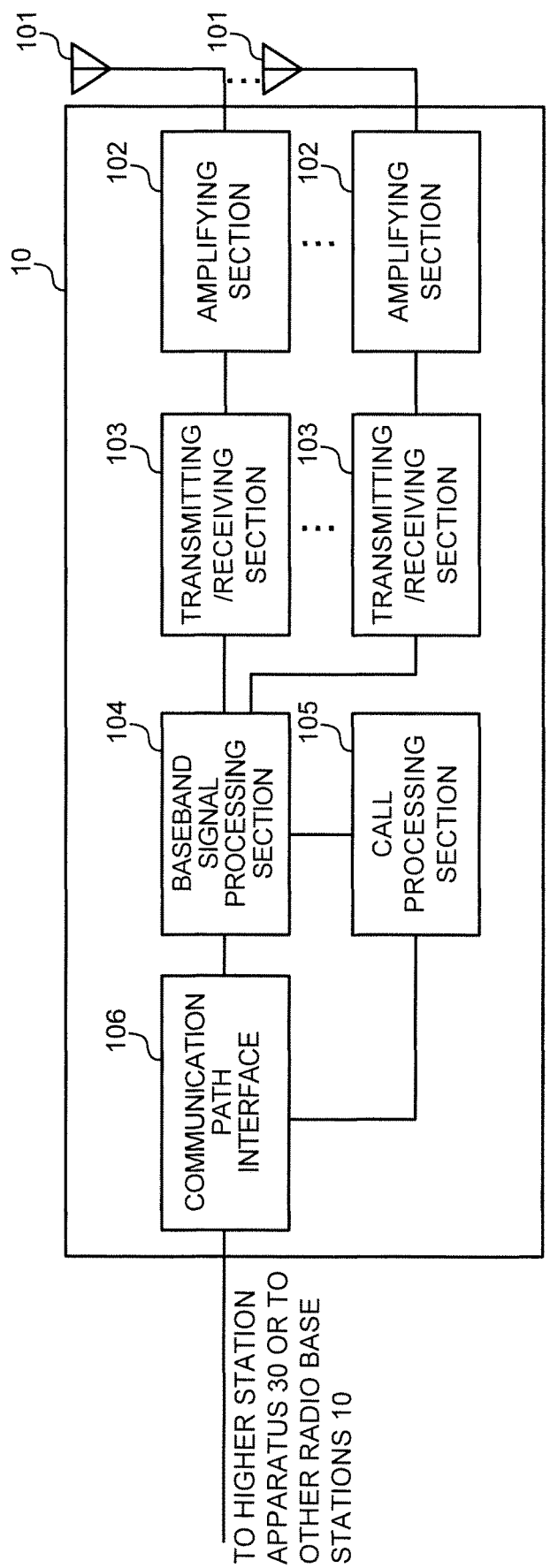
FIG. 29 is a diagram to show an example of an overall structure of a radio base station according to one embodiment of the present invention.

FIG. 29 is a diagram to show an example of an overall structure of a radio base station according to an embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 may furthermore have an analog beamforming section that forms analog beams. The analog beamforming section may be constituted by an analog beamforming circuit (for example, a phase shifter, a phase shifting circuit, etc.) or analog beamforming apparatus (for example, a phase shifting device) that can be described based on general understanding of the technical field to which the present invention pertains. Furthermore, the transmitting/receiving antennas 101 may be constituted by, for example, array antennas.

The transmitting/receiving sections 103 transmit specifying information to the user terminal 20. Furthermore, the transmitting/receiving section 103 may transmit an allocation number, which is selected based on a predetermined rule, to the user terminal 20 as specifying information. In addition, the transmitting/receiving sections 103 may transmit a bit sequence, which contains a specific bit sequence (reserved bit sequence) at the end, to the user terminal 20.

In addition, the transmitting/receiving sections 103 may transmit information related to the number of bits to constitute the specifying information, to the user terminal 20, in advance. Furthermore, the transmitting/receiving sections

103 may transmit reporting information that specifies the reference resource, to the user terminal 20, in downlink control information. Furthermore, the transmitting/receiving sections 103 may transmit information that specifies the relative coordinates of interlaced allocating resources, which are arranged at intervals, and/or the bandwidth which is subject to interlacing and in which interlaced allocating resources are present, to the user terminal 20, as specifying information.

Figure 30:
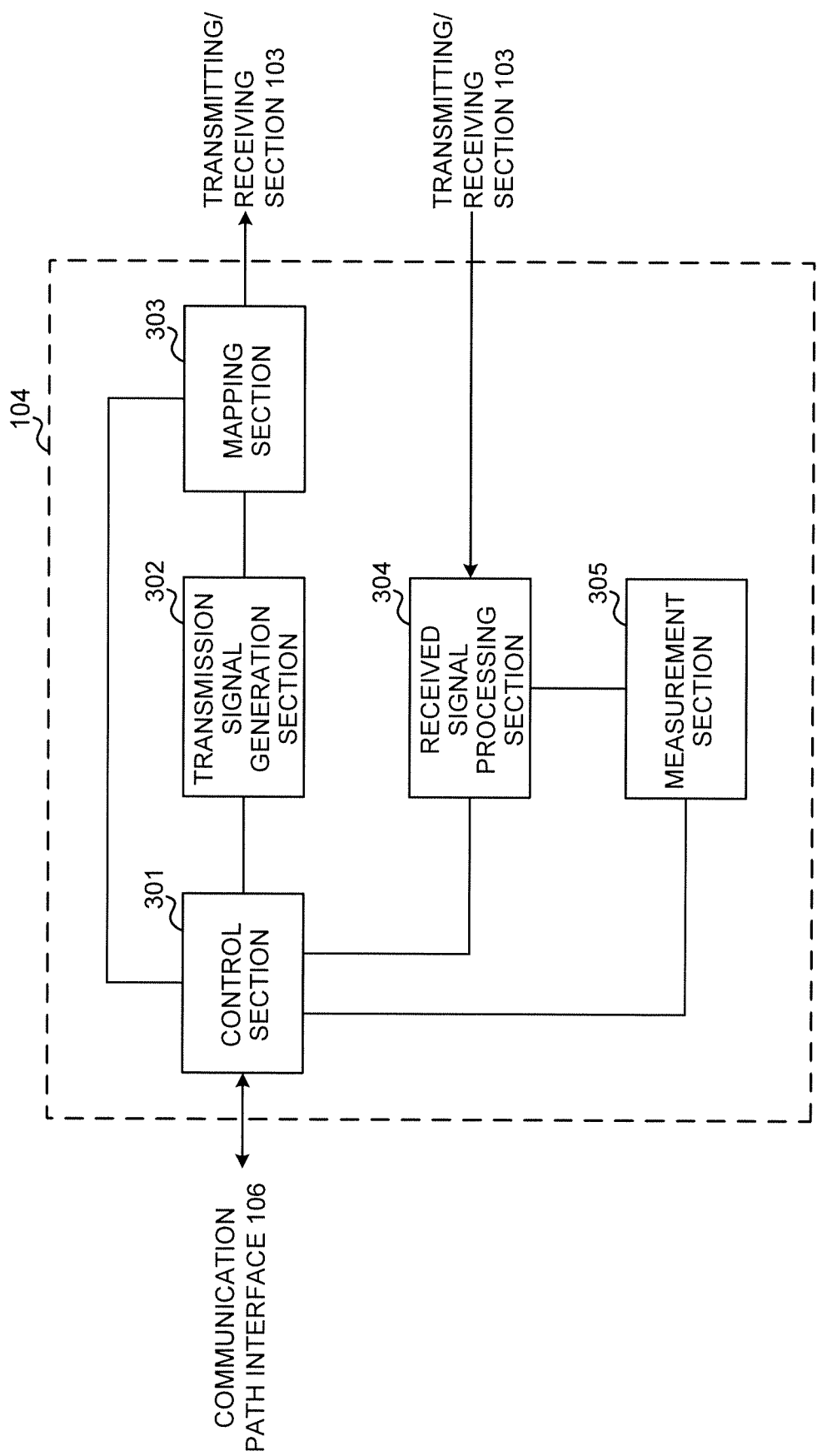
FIG. 30 is a diagram to show an example of a functional structure of a radio base station according to one embodiment of the present invention.

FIG. 30 is a diagram to show an example of a functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of downlink data signals that are transmitted in the PDSCH and downlink control signals that are communicated in the PDCCH and/or the EPDCCH. Also, the control section 301 controls the generation of downlink control signals (for example, delivery acknowledgement information and so on), downlink data signals and so on, based on whether or not retransmission control is necessary, which is decided in response to uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DM-RS, etc.) and so on.

In addition, the control section 301 controls the scheduling of uplink data signals transmitted in the PUSCH, uplink control signals (for example, delivery acknowledgement information) transmitted in the PUCCH and/or the PUSCH, random access preambles transmitted in the PRACH, uplink reference signals, and so on.

The control section 301 may exert control so that transmitting beams and/or receiving beams are formed using digital BF (for example, precoding) by the baseband signal processing section 104 and/or analog BF (for example, phase rotation) by the transmitting/receiving sections 103.

Furthermore, the control section 301 may exert control so that specifying information is transmitted to the user terminal 20. The control section 301 may exert control so that an allocation number, which is selected based on a predetermined rule, is transmitted to the user terminal 20 as specifying information. Furthermore, the control section 301 may exert control so that a bit sequence containing a specific bit sequence (reserved bit sequence) at the end is transmitted to the user terminal 20.

Furthermore, the control section 301 may exert control so that information related to the number of bits to constitute the specifying information is transmitted to the user terminal 20 in advance. Furthermore, the control section 301 may exert control so that reporting information that specifies the reference resource is transmitted to the user terminal 20 in downlink control information. Furthermore, the control section 301 may exert control so that information specifying the relative coordinates of interlaced allocating resources, arranged at intervals, and/or the bandwidth which is subject to interlacing and in which interlaced allocating resources are present, is transmitted to the user terminal 20 as specifying information.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink signal allocation information, and UL grants, which report uplink signal allocation information, based on commands from the control section 301. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information, acquired through the receiving processes, to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signal. The measurement section 305 can be constituted by a measurer, a measurement circuit or measurement apparatus that can be described based on general understanding of the technical field to which the present invention pertains.

When signals are received, the measurement section 305 may measure, for example, the received power (for example, RSRP (Reference Signal Received Power)), the received quality (for example, RSRQ (Reference Signal Received Quality)), SINR (Signal to Interference plus Noise Ratio) and/or the like), uplink channel information (for example, CSI) and so on. The measurement results may be output to the control section 301.

(User Terminal)

Figure 31:
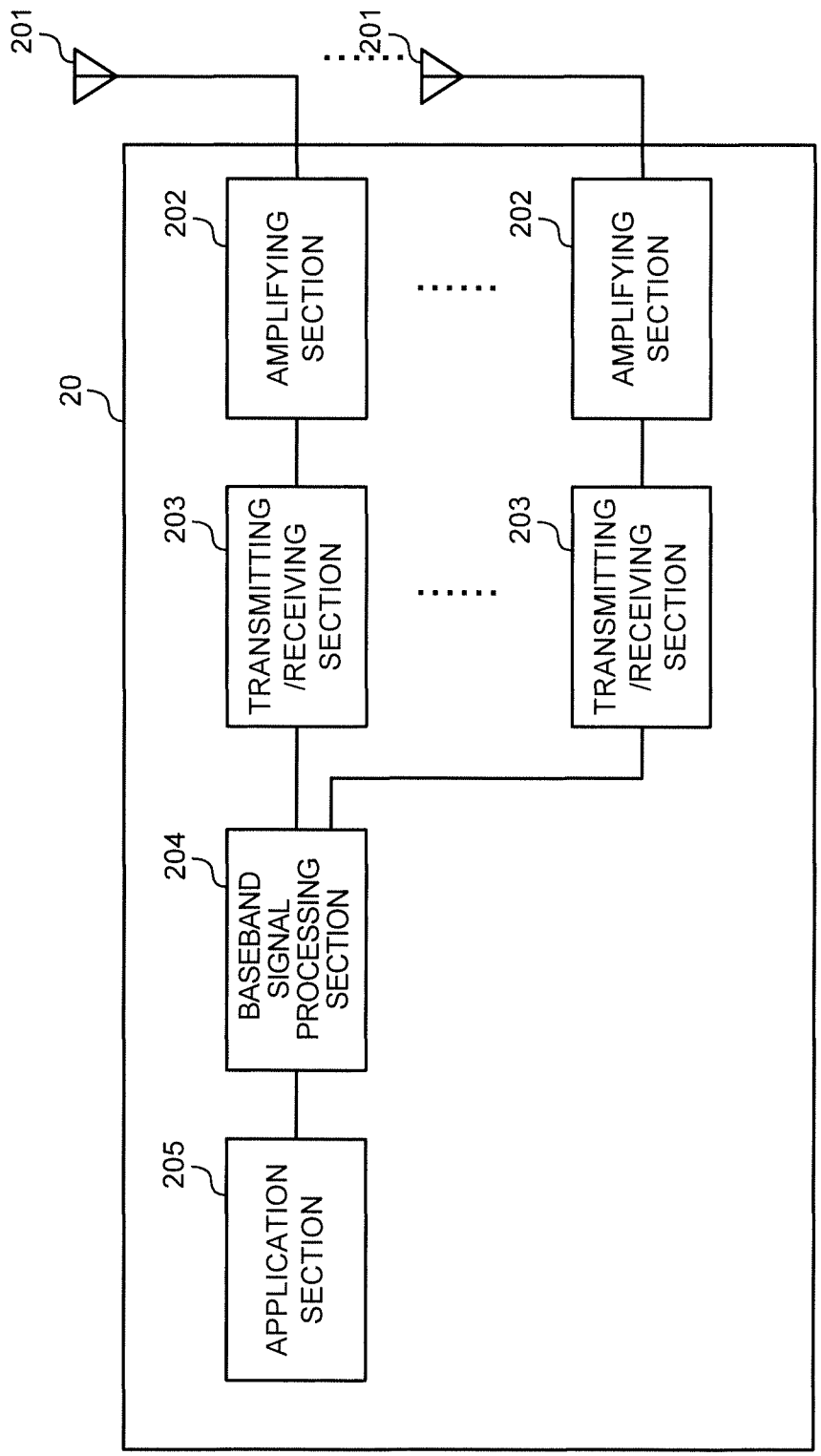
FIG. 31 is a diagram to show an example of an overall structure of a user terminal according to one embodiment of the present invention.

FIG. 31 is a diagram to show an example of an overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

721//The baseband signal processing section 204 performs, for the baseband signal that is input, an FFT process, error correction decoding, a retransmission control receiving process and so on. Downlink user data is forwarded to the application section 205. The application section 205 performs processes related to higher layers above the physical layer and the MAC layer, and so on. In the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 may furthermore have an analog beamforming section that forms analog beams. The analog beamforming section may be constituted by an analog beamforming circuit (for example, a phase shifter, a phase shifting circuit, etc.) or analog beamforming apparatus (for example, a phase shifting device) that can be described based on general understanding of the technical field to which the present invention pertains. Furthermore, the transmitting/receiving antennas 201 may be constituted by, for example, array antennas.

The transmitting/receiving sections 203 receive specifying information from the radio base station 10. Furthermore, the transmitting/receiving sections 203 may receive an allocation number, which is selected based on a predetermined rule, as specifying information, from the radio base station 10. In addition, the transmitting/receiving sections 203 may receive a bit sequence, which contains a specific bit sequence (reserved bit sequence) at the end, from the radio base station 10.

In addition, the transmitting/receiving sections 203 may receive information about the number of bits to constitute the specifying information, in advance, from the radio base station 10. In addition, the transmitting/receiving sections 203 may receive reporting information that specifies the reference resource, from the radio base station 10, in downlink control information. Furthermore, the transmitting/receiving sections 203 may receive information that specifies the relative coordinates of interlaced allocating resources, which are arranged at intervals, and/or the bandwidth which is subject to interlacing and in which interlaced allocating resources are present, from the radio base station 10, as specifying information.

Figure 32:
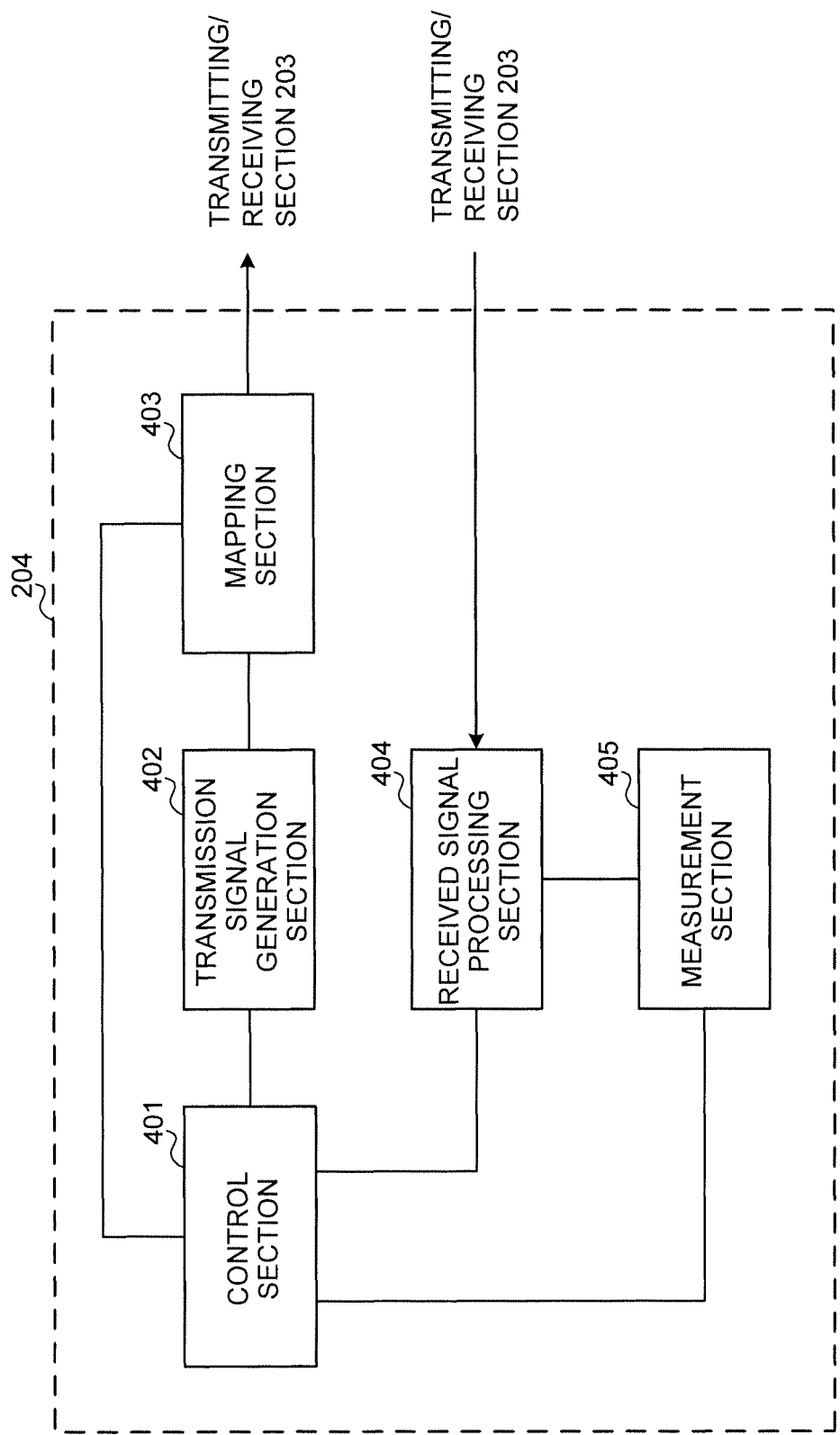
FIG. 32 is a diagram to show an example of a functional structure of a user terminal according to one embodiment of the present invention.

FIG. 32 is a diagram to show an example of a functional structure of a user terminal according to an embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires downlink control signals (signals transmitted in the PDCCH/EPDCCH) and downlink data signals (signals transmitted in the PDSCH) transmitted from the radio base station 10, via the received signal processing section 404. The control section 401 controls the generation of uplink control signals (for example, delivery acknowledgement information and so on) and/or uplink data signals based on whether or not retransmission control is necessary, which is decided in response to downlink control signals and/or downlink data signals, and so on.

The control section 401 may exert control so that transmitting beams and/or receiving beams are formed using digital BF (for example, precoding) by the baseband signal processing section 204 and/or analog BF (for example, phase rotation) by the transmitting/receiving sections 203.

In addition, the control section 401 determines the allocation of radio resources that are used to transmit or receive signals, based on specifying information acquired from the received signal processing section 404. Also, the control section 401 may specify the frequency offset and the amount of resources to be allocated, based on an allocation number. Also, the control section 401 may judge that a bit sequence other than a specific bit sequence serves as specifying information. Also, the control section 401 may judge the number of bits to constitute the specifying information, based on the number of bits to constitute the specifying information, which is reported in advance.

Furthermore, the control section 401 may select a reference resource from a plurality of candidate reference resources based on reporting information that serves to specify the reference resource. In addition, the control section 401 may determine the allocation of interlaced allocating resources based on specifying information that specifies the relative coordinates of interlaced allocating resources, arranged at intervals, and the interlacing bandwidth in which interlaced allocating resources are present.

In addition, when various pieces of information reported from the radio base station 10 are acquired from the received signal processing section 404, the control section 401 may update the parameters used for control based on the information.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. For example, the measurement section 405 performs measurements using downlink reference signals transmitted from the radio base station 10. The measurement section 405 can be constituted by a measurer, a measurement circuit or measurement apparatus that can be described based on general understanding of the technical field to which the present invention pertains.

The measurement section 405 may measure, for example, the received power (for example, RSRP), the received quality (for example, RSRQ, received SINR), down link channel information (for example, CSI) and so on of the received signals. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these multiple pieces of apparatus.

Figure 33:
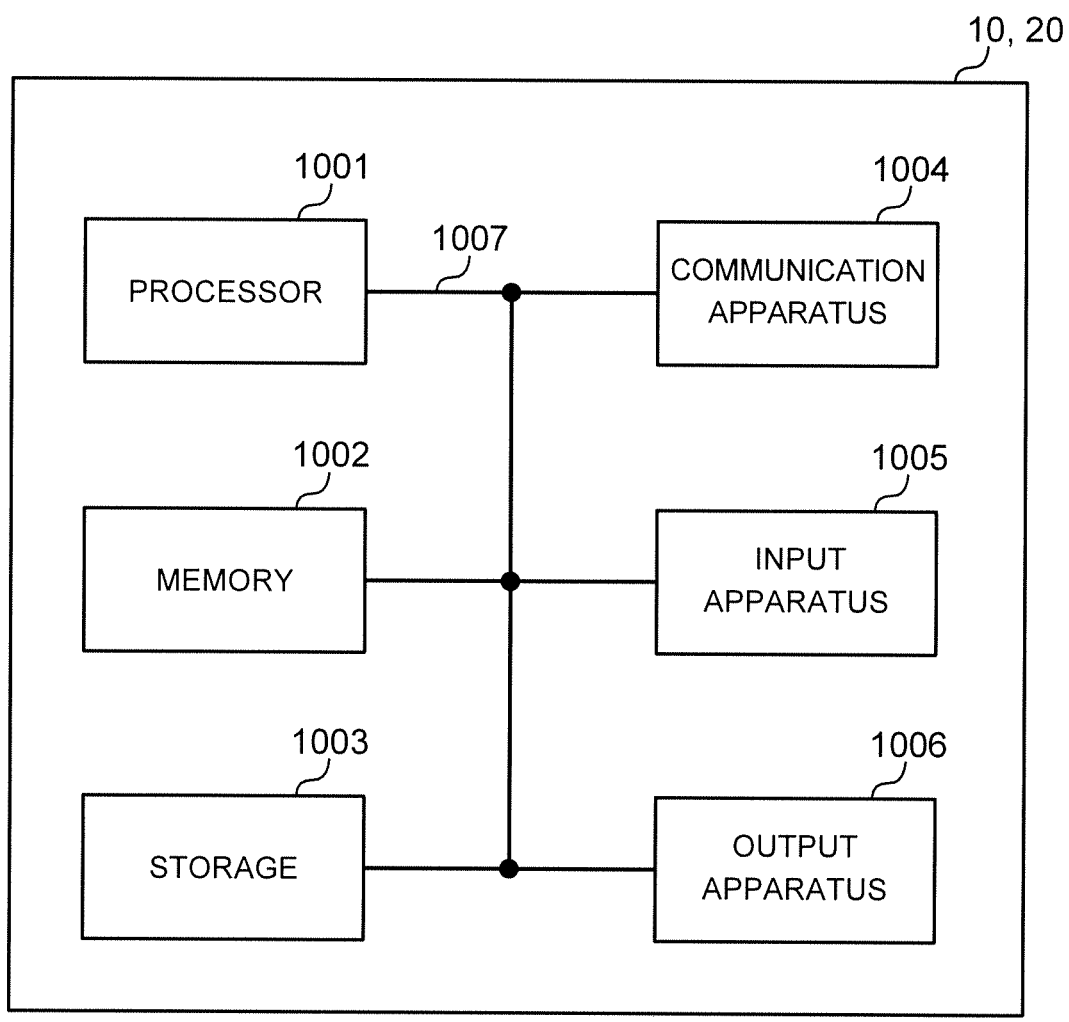
FIG. 33 is a diagram to show an example hardware structure of a radio base station and a user terminal according to one embodiment of the present invention.

For example, the radio base station, user terminals and so on according to one embodiment of the present invention may function as a computer that executes the processes of the radio communication method of the present invention. FIG. 33 is a diagram to show an example hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented either simultaneously or in sequence, or in different manners, on two or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving apparatus) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on).

Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. Furthermore, a slot may be comprised of one or more symbols in the time domain (OFDM (Orthogonal Frequency Division Multiplexing) symbols, SC-FDMA (Single Carrier Frequency Division Multiple Access) symbols, and so on).

A radio frame, a subframe, a slot and a symbol all represent the time unit in signal communication. A radio frame, a subframe, a slot and a symbol may be each called by other applicable names. For example, one subframe may be referred to as a "transmission time interval (TTI)," or a plurality of consecutive subframes may be referred to as a "TTI," and one slot may be referred to as a "TTI." That is, a subframe and/or a TTI may be a subframe (1 ms) in existing LTE, may be a shorter period than 1 ms (for example, one to thirteen symbols), or may be a longer period of time than 1 ms.

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this. TTIs may be the time unit for transmitting channel-encoded data packets (transport blocks), or may be the unit of processing in scheduling, link adaptation and so on.

A TTI having a time duration of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "shortened subframe," a "short subframe," and so on.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI in length. One TTI and one subframe each may be comprised of one or more resource blocks. Note that an RB may be referred to as a "physical resource block (PRB (Physical RB))," a "PRB pair," an "RB pair," and so on.

Furthermore, a resource block may be comprised of one or more resource elements (REs). For example, one RE may be a radio resource field of one subcarrier and one symbol.

Note that the above-described structures of radio frames, subframes, slots, symbols and so on are simply examples. For example, configurations such as the number of subframes included in a radio frame, the number of slots included in a subframe, the number of symbols and RBs included in a slot, the number of subcarriers included in an RB, the number of symbols in a TTI, the symbol duration and the cyclic prefix (CP) duration can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, in a memory), or may be managed in a control table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBS) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information, or by reporting a different piece of information). Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal,"

"remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by higher nodes (upper nodes). In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method of distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency fields, microwave regions and optical (both visible and invisible) regions.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2016-157996, filed on Aug. 10, 2016, including the specification, drawings and abstract, is incorporated herein by reference in its entirety.

The invention claimed is:

1. A terminal comprising:
   a receiver that receives Radio Resource Control (RRC) signaling including information related to one or more reference resources; and
   a processor that determines one reference resource out of the one or more reference resources,
   wherein the one or more reference resources are related to a number of information bits for resource allocation included in downlink control information, and
   wherein the processor determines an allocated resource based on the one reference resource determined and size information in units of a set of consecutive resources provided.

2. A radio communication method for a terminal, comprising:
- receiving Radio Resource Control (RRC) signaling including information related to one or more reference resources;
- determining one reference resource out of the one or more reference resources; and
- determining an allocated resource based on the one reference resource determined and size information in units of a set of consecutive resources provided,
- wherein the one or more reference resources are related to a number of information bits for resource allocation included in downlink control information.

* * * * *